US012533371B2

(12) United States Patent
Fernández Mollar et al.

(10) Patent No.: US 12,533,371 B2
(45) Date of Patent: Jan. 27, 2026

(54) MULTILAYER PHARMACEUTICAL OR NUTRACEUTICAL SOLID DOSAGE FORMS COMPRISING PYRIMIDINE AND/OR PURINE DERIVATIVES AND B VITAMINS, PREPARATION AND USES THEREOF

(71) Applicant: FERRER INTERNACIONAL, S.A., Barcelona (ES)

(72) Inventors: Berta Fernández Mollar, Sant Cugat del Vallès (ES); Pablo Martín Sáiz, Sant Cugat del Vallès (ES)

(73) Assignee: FERRER INTERNACIONAL, S.A., Barcelona (ES)

( * ) Notice: Subject to any disclaimer, the term of this patent is extended or adjusted under 35 U.S.C. 154(b) by 1004 days.

(21) Appl. No.: 17/606,701

(22) PCT Filed: Nov. 6, 2019

(86) PCT No.: PCT/EP2019/080413
§ 371 (c)(1),
(2) Date: Oct. 26, 2021

(87) PCT Pub. No.: WO2020/224795
PCT Pub. Date: Nov. 12, 2020

(65) Prior Publication Data
US 2022/0160744 A1 May 26, 2022

(30) Foreign Application Priority Data
May 6, 2019 (EP) .................................... 19382340

(51) Int. Cl.
*A61K 31/7072* (2006.01)
*A61K 9/00* (2006.01)
*A61K 9/24* (2006.01)
*A61K 31/4415* (2006.01)
*A61K 31/51* (2006.01)
*A61K 31/7068* (2006.01)
*A61K 31/714* (2006.01)

(52) U.S. Cl.
CPC ........ *A61K 31/7072* (2013.01); *A61K 9/0053* (2013.01); *A61K 9/209* (2013.01); *A61K 31/4415* (2013.01); *A61K 31/51* (2013.01); *A61K 31/7068* (2013.01); *A61K 31/714* (2013.01)

(58) Field of Classification Search
CPC . A61K 31/4415; A61K 31/51; A61K 31/7068
See application file for complete search history.

(56) References Cited

U.S. PATENT DOCUMENTS

| 4,868,180 A * | 9/1989 | Izuhara ................ A61K 9/1688 514/355 |
| 5,817,340 A | 10/1998 | Roche et al. |
| 9,789,131 B1 * | 10/2017 | Korinek .................... A61P 9/00 |
| 2007/0082065 A1 * | 4/2007 | Krawitz ............... A61K 31/375 514/474 |
| 2008/0311186 A1 * | 12/2008 | Park ................... A61K 31/7072 536/26.21 |

FOREIGN PATENT DOCUMENTS

| CA | 995133 A | 8/1976 |
| CN | 1646139 A | 7/2005 |
| EP | 0 348 688 A1 | 1/1990 |
| GB | 1 363 398 A | 8/1974 |
| WO | WO 2006/089493 A1 | 8/2006 |
| WO | WO 2006/126663 A1 | 11/2006 |
| WO | WO 2009/008683 A2 | 1/2009 |
| WO | WO 2012/125020 A1 | 9/2012 |
| WO | WO 2012/125034 A1 | 9/2012 |
| WO | WO 2018/153914 A1 | 8/2018 |

OTHER PUBLICATIONS

Kottala, N. et al. "Evaluation of the Performance Characteristics of Bilayer Tablets: Part I. Impact of Material Properties and Process Parameters on the Strength of Bilayer Tablets" AAPS PharmSciTech, vol. 13, No. 4, Dec. 2012 (Year: 2012).*
International Search Report for PCT/EP2019/080413 (PCT/ISA/210) mailed on Feb. 5, 2020.
Written Opinion of the International Searching Authority for PCT/EP2019/080413 (PCT/ISA/237) mailed on Feb. 5, 2020.
Chinese Office Action and Search Report for corresponding Chinese Application No. 201980096023.8, dated Dec. 5, 2022, with an English translation.
Dominican Republic Office Action for corresponding Dominican Application No. P2021-0225, dated Oct. 28, 2022.
Tryhubchak et al., "Modern State of Creation, Production and Research of Tablet Drugs," Pharmaceutical Review, No. 2, 2018, pp. 102-110, with an English translation.
Ukrainian Office Action for corresponding Ukrainian Application No. a 2021 06780, dated Aug. 1, 2023, with an English translation.

* cited by examiner

*Primary Examiner* — Andrew S Rosenthal
(74) *Attorney, Agent, or Firm* — Birch, Stewart, Kolasch & Birch, LLP

(57) ABSTRACT

The present invention relates to a multilayer pharmaceutical or nutraceutical solid dosage form comprising at least one pyrimidine derivative, purine derivative or any salt or solvate thereof and least one B-group vitamin. It also provides three methods for producing said multilayer pharmaceutical or nutraceutical solid dosage forms. Furthermore, the present invention is also related to therapeutic uses of said multilayer pharmaceutical or nutraceutical solid dosage forms, particularly for the treatment and/or prevention of peripheral neuropathy.

19 Claims, No Drawings

MULTILAYER PHARMACEUTICAL OR NUTRACEUTICAL SOLID DOSAGE FORMS COMPRISING PYRIMIDINE AND/OR PURINE DERIVATIVES AND B VITAMINS, PREPARATION AND USES THEREOF

This application claims the benefit of European Patent Application EP19382340.8 filed on May 6, 2019.

TECHNICAL FIELD

The present invention relates to a multilayer pharmaceutical or nutraceutical solid dosage form comprising at least one pyrimidine derivative, purine derivative or any salt or solvate thereof and at least one B-group vitamin, which advantageously provides high pyrimidine and/or purine derivative amounts while at the same time ensuring enhanced chemical stability of the solid dosage form towards humidity and/or acidic conditions. The present invention also provides methods for producing said multilayer pharmaceutical or nutraceutical solid dosage forms.

Furthermore, the present invention is also related to therapeutic uses of said multilayer pharmaceutical or nutraceutical solid dosage forms, particularly for the treatment and/or prevention of peripheral neuropathy.

BACKGROUND ART

Neuropathic pain is caused by primary lesion or damage to the central or peripheral nervous system. Specifically, peripheral nervous system (PNS) injuries involve axon damage, so that not only it is necessary to eliminate damage for full recovery, but structure and function restoring are also required. However, in contrast to central nervous system (CNS) axons, those of PNS cannot regenerate spontaneously (Huebner, E. A.; Strittmatter, S. M. *Cell Biology of the Axon* 2009; Springer Berlin Heidelberg; 305-60).

Regarding the latter, it is known that, unlike cellular repair in other areas in human body, peripheral nerve injury does not involve mitosis and cellular proliferation (Burnett, M. G.; Zager, E. L. *Neurosurg. Focus* 2004; 16(5):E1). Furthermore, advances in molecular biology evidence that the response of the peripheral nerve to injury extends beyond the site of damage and actually involves neural cells in the spinal cord and ganglia. Thus, the injured peripheral nerve attempts to compensate for the lost functions by strengthening and reprogramming uninjured pathways (Burnett, M. G.; Zager, E. L. *Neurosurg. Focus* 2004; 16(5):E1), although the actual full recovery mechanism still remains unknown.

Pyrimidine and/or purine derivatives, in particular pyrimidine and/or purine nucleosides and nucleotides, are known precursors of nucleic acids, which interact with membrane receptors and activate many intracellular signal pathways. More specifically, it is known in the art that pyrimidine nucleotides play several fundamental roles in cellular metabolism, asides from being DNA components and participating in genome transcription and translation, including energy transfer for chemical bonding, neurotransmission and transfer of biochemical radicals from intermediate metabolism.

In particular, cytidine and uridine are necessary for the synthesis of glycolipids, phospholipids and glycoproteins, which are known components of nerve membranes. They have been shown to play essential roles in several processes such as membrane synthesis, transcription, translation, cell division and peripheral nerve regeneration.

Uridine derivatives, in particular uridine nucleotides, have been shown to play an essential co-stimulatory role in wound healing processes, as well as in activation and modulation of growth factors, which confirms the capital importance of nucleotides in the process of tissue regeneration.

Cytidine derivatives, in particular cytidine nucleotides, have also proven to be beneficial for the treatment of various central nervous system pathologies as well as neurodegenerative diseases.

It is known, however, that peripheral nervous system axons are not able to synthesize the nucleotides needed for repairing the damage, particularly pyrimidine nucleotides. For this reason, administration of exogenous nucleotides after PNS damage becomes crucial for structural and functional recovery.

The important role of purine nucleotides in both peripheral and central nervous systems has also received increased attention since purinergic neurotransmission was proposed in 1972 following identification of adenosine 5'-triphosphate (ATP) as the transmitter in non-adrenergic, non-cholinergic inhibitory nerves in guinea-pig taenia coli (Burnstock G. *Pharmacol Rev.* 1972, 24, 509-581). Adenosine and its phosphorylated nucleotides act as neurotransmitters or trophic agents in the nervous system, and similar roles exist for guanosine and its nucleotides.

On the other hand, B vitamin complexes, in particular, vitamin $B_1$, vitamin $B_6$ and vitamin $B_{12}$ have been shown to play key roles in a number of biological pathways to maintain normal neural function (Corinne, G.; Mizisin, L. M.; Austin, N. B. *Eur. J. Pharmacol.* 2009; 612; 41-47). In fact, deficiencies of certain B vitamins are closely related to a significant number of neuropathies, so supplementation of these vitamins becomes increasingly important in patients diagnosed with these conditions.

By way of illustration, biochemical evidence suggests that supplementation of high doses of methylcobalamin may upregulate gene transcription and thereby protein synthesis, thus contributing to enhance peripheral nerve regeneration (Watanabe; T. E. *J Neurol Sci.* 1994; 12; 140-143).

Also, due to the severity of several $B_6$ vitamin-related neuropathies, dietary intake of this vitamin becomes crucial, due to the fact that it is converted into pyridoxal phosphate (active form of pyridoxine) after absorption, which is an important co-factor in numerous metabolic reactions, and also because humans are not able to synthesize it. Deficiencies of this vitamin reveal severely reduced sensory nerve action potentials (SNAPs) and may lead to axonal degeneration of small and large myelinated fibers.

Vitamin $B_1$ is also known to be a valuable contributor to PNS health since it participates in the synthesis of the neurotransmitter acetylcholine. Thiamine also facilitates the conduction of nerve impulses through peripheral nerves, and is recognised for being instrumental in myelin production.

There exist a number of currently available formulations comprising mixtures of nucleotides and vitamins which aim at treating nerve pain, all of them involving direct mixtures of nucleotides and vitamins. However, the inventors have found that pyrimidine and/or purine derivatives, in particular, nucleotide and nucleoside ingredients, which usually include noteworthy amounts of water, cause vitamins $B_1$, $B_6$ and $B_{12}$ degradation due to the fact that they are in intimate contact with them. Acidic conditions have also been found to have a negative impact on vitamin stability. In this regard, it has been surprisingly found that stability of the compositions comprising pyrimidine and/or purine derivatives or any salt or solvate thereof, in particular, nucleotides or nucleosides or any salt or solvate thereof, and B-group vitamins is enhanced with the current invention.

Currently marketed formulations include a number of preservatives, and even in those cases, they require strict storage conditions below 25° C., and also involve the use of desiccant material in their packaging, e.g. HDPE bottles with silica gel desiccant.

The inventors have realised that stability problems are particularly constraining when the amount of pyrimidine and/or purine derivatives, in particular, pyrimidine and/or purine nucleotides or nucleosides, is increased. In fact, the existing formulations only include reduced amounts of nucleotides, which is a significant constraint for achieving maximum results in terms of nerve injury recovery, since higher amounts of pyrimidine and/or purine derivatives, more particularly, of pyrimidine and/or purine nucleotides or nucleosides are required.

Therefore, there is a rising need in the art to find a new technical solution which can overcome the abovementioned stability problems associated to humidity and/or acidic conditions, and also provide new high-dose dosage forms of pyrimidine and/or purine derivatives or any salt or solvate thereof also comprising B-group vitamins, which can tackle peripheral neuropathies in a more efficient manner, in particular, new high-dose nucleotide and B-group vitamin dosage forms.

SUMMARY OF THE INVENTION

In a first aspect, the invention provides a multilayer pharmaceutical or nutraceutical solid dosage form for oral administration comprising:
  a first layer comprising at least one pyrimidine derivative, purine derivative, or any salt or solvate thereof; and
  a second layer comprising at least one vitamin selected from the group consisting of B-group vitamins.

In a second, third and fourth aspects, the invention provides three methods for producing the multilayer pharmaceutical or nutraceutical solid dosage forms according to the first aspect of the invention, in particular, bilayer or trilayer pharmaceutical or nutraceutical solid dosage forms according to the first aspect of the invention.

According to a fifth aspect of the invention, a multilayer pharmaceutical or nutraceutical solid dosage form according to the first aspect of the invention which is obtainable by the process according to the second aspect of the invention is provided.

In a sixth aspect of the invention, a multilayer pharmaceutical or nutraceutical solid dosage form according to the first aspect of the invention which is obtainable by the process according to the third aspect of the invention is provided.

In a seventh aspect of the invention, a multilayer pharmaceutical or nutraceutical solid dosage form according to the first aspect of the invention which is obtainable by the process according to the fourth aspect of the invention is provided.

In a eighth aspect of the invention, a multilayer pharmaceutical or nutraceutical solid dosage form according to the first aspect of the invention is provided for the manufacture of a medicament or nutraceutical product respectively, for the treatment and/or prevention of peripheral neuropathy.

According to a ninth aspect, a multilayer pharmaceutical or nutraceutical solid dosage form for use in the treatment and/or prevention of peripheral neuropathy is provided.

In an tenth aspect of the invention, the use of a multilayer nutraceutical solid dosage form according to the first aspect of the invention in the treatment and/or prevention of peripheral neuropathy is provided.

DETAILED DESCRIPTION OF THE INVENTION

The present invention is related to a multilayer pharmaceutical or nutraceutical solid dosage form for oral administration comprising at least one pyrimidine derivative, purine derivative, or any salt or solvate thereof, and least one B-group vitamin, in particular, at least one pyrimidine derivative and at least one B-group vitamin, which advantageously provides enhanced chemical stability towards humidity and/or acidic conditions, in particular, enhanced B vitamin chemical stability towards humidity and/or acidic conditions. As a result, the solid dosage forms herein provided require less or no preserving agents while, at the same time, less restricted storage conditions are necessary compared to already existing formulations as regards temperature, relative humidity and packaging conditions.

The expression "acidic conditions", as used herein, may refer to the presence of a certain amount of a chemical compound in acid form, such as a pyrimidine or purine derivative in acid form (e.g. UMP or CMP in acid form).

As used herein, the expression "nutraceutical solid dosage form" is understood to mean that the formulation provides overall health benefits, or triggers a physiological response. Such formulations may also be referred to as dietary supplements, also known as food supplements or nutritional supplements, and are usually intended to further support the diet and provide nutrients that may be missing or may not be consumed in sufficient quantities in a person's diet.

In a first aspect, the invention provides a multilayer pharmaceutical or nutraceutical solid dosage form for oral administration comprising:
  a first layer comprising at least one pyrimidine derivative, purine derivative, or any salt or solvate thereof; and
  a second layer comprising at least one vitamin selected from the group consisting of B-group vitamins.

Pyrimidine derivatives of the invention include, but are not limited to, uridine, uridine esters, uridine phosphates, cytidine, cytidine esters, cytidine phosphates, thymidine, thymidine esters and thymidine phosphates. Purine derivatives of the invention include, but are not limited to, adenosine, adenosine esters, adenosine phosphates, guanosine, guanosine esters, guanosine phosphates, inosine (hypoxanthine nucleoside), inosine esters, inosine phosphates, xanthosine, xanthosine esters and xanthosine phosphates.

Pyrimidine phosphate derivatives (e.g. uridine phosphates, cytidine phosphates, thymidine phosphates) and purine phosphate derivatives (e.g. adenosine phosphates, guanosine phosphates, inosine phosphates and xanthosine phosphates) are also known in the art as nucleotides and are composed of at least three sub-units, namely, a five-carbon sugar moiety which is typically ribose, a nitrogenous base which is typically either purine or pyrimidine, and at least one phosphate group. Regarding the latter, nucleotides can be mono-, di- or tri-phosphate nucleotides depending on the number of phosphate groups present in the molecule.

Specific examples of uridine phosphates include, but are not limited to, uridine monophosphates, in particular uridine 5'-monophosphate (UMP); uridine diphosphate (UDP) and uridine triphosphate (UTP). Specific examples of cytidine phosphates include, but are not limited to, cytidine monophosphates, in particular cytidine 5'-monophosphate (CMP); cytidine diphosphate (CDP) and cytidine triphosphate (CTP). Specific examples of thymidine phosphates include, but are not limited to, thymidine monophosphates, in particular thymidine 5'-monophosphate (TMP); thymidine diphosphate (TDP) and thymidine triphosphate (TTP). Examples of purine phosphate derivatives of the invention include, but are not limited to, adenosine 5'-monophosphate (AMP); adenosine diphosphate (ADP), adenosine triphosphate (ATP), guanosine 5'-monophosphate (GMP); guanosine diphosphate (GDP); guanosine triphosphate (GTP); inosine 5'-monophosphate (IMP); inosine diphosphate (IDP); inosine triphosphate (ITP); xanthosine 5'-monophosphate (XMP); xanthosine diphosphate (XDP) and xanthosine triphosphate (XTP).

Pyrimidine and purine derivatives uridine, cytidine, thymidine, adenosine, guanosine, inosine and xanthosine, on the other hand, are known in the art as nucleosides, and are composed of at least two sub-units, namely, a five-carbon sugar moiety which is typically ribose and a nitrogenous base which is typically either purine or pyrimidine.

According to a preferred embodiment, the at least one pyrimidine derivative, purine derivative, or any salt or solvate thereof is selected from the group consisting of uridine, uridine esters, uridine phosphates, cytidine, cytidine esters, cytidine phosphates, thymidine, thymidine esters, thymidine phosphates, adenosine, adenosine esters, adenosine phosphates, guanosine, guanosine esters, guanosine phosphates, inosine, inosine esters, inosine phosphates, xanthosine, xanthosine esters, xanthosine phosphates and any salt or solvate thereof. More preferably, the at least one pyrimidine derivative, purine derivative, or any salt or solvate thereof is selected from the group consisting of uridine, uridine phosphates, cytidine, cytidine phosphates, thymidine, thymidine phosphates, adenosine, adenosine phosphates, guanosine, guanosine phosphates, inosine, inosine phosphates, xanthosine, xanthosine phosphates and any salt or solvate thereof. Still more preferably, the at least one pyrimidine derivative, purine derivative, or any salt or solvate thereof is selected from the group consisting of uridine, uridine phosphates, cytidine, cytidine phosphates, thymidine, thymidine phosphates, adenosine, adenosine phosphates, guanosine, guanosine phosphates and any salt or solvate thereof. Still even more preferably, the at least one pyrimidine derivative, purine derivative, or any salt or solvate thereof is selected from the group consisting of uridine, uridine phosphates, cytidine, cytidine phosphates, thymidine, thymidine phosphates, adenosine, adenosine phosphates and any salt or solvate thereof.

Examples of suitable pyrimidine derivative salts or purine derivative salts include, but are not limited to alkali metal salts (e.g. sodium or potassium salts); alkaline earthmetal salts (e.g. calcium, magnesium or barium salts); basic amino acid salts (e.g. arginine or lysine salts); ammonium salts (e.g. ammonium or tricyclohexylammonium salts); alkanolamine salts (e.g. monoethanolamine, diethanolamine, triethanolamine, monoisopropanolamine, diisopropanolamine or triisopropanolamine salts) or any mixture thereof.

In another preferred embodiment, the invention provides a multilayer pharmaceutical or nutraceutical solid dosage form for oral administration comprising:
  a first layer comprising at least one pyrimidine derivative or any salt or solvate thereof; and
  a second layer comprising at least one vitamin selected from the group consisting of B-group vitamins.

In a preferred embodiment, the at least one pyrimidine derivative is selected from the group consisting of uridine, uridine esters, uridine phosphates, cytidine, cytidine esters and cytidine phosphates. More preferably, the at least one pyrimidine derivative is selected from the group consisting of uridine, uridine phosphates, cytidine and cytidine phosphates.

In a preferred embodiment, the at least one vitamin present in the second layer of the multilayer pharmaceutical or nutraceutical solid dosage form of the invention is selected from the group consisting of vitamins $B_1$, $B_6$ and $B_{12}$. Preferably, the second layer of the multilayer pharmaceutical or nutraceutical solid dosage form of the invention comprises vitamin $B_{12}$; more preferably, the second layer of the multilayer pharmaceutical or nutraceutical solid dosage form of the invention comprises at least two vitamins selected from the group consisting of vitamins $B_1$, $B_6$ and $B_{12}$. In another preferred embodiment, the second layer of the multilayer pharmaceutical or nutraceutical solid dosage form of the invention comprises vitamin $B_1$ and vitamin $B_{12}$. Still more preferably, the second layer of the multilayer pharmaceutical or nutraceutical solid dosage form of the invention comprises vitamins $B_1$, $B_6$ and $B_{12}$.

Vitamin $B_1$, also known as thiamine, can be included in the formulations of the invention in any suitable form such as thiamine hydrochloride, thiamine nitrate, thiamine pyrophosphate or thiamine monophosphate chloride dihydrate. Preferably, it is present either as thiamine hydrochloride or thiamine nitrate. More preferably, vitamin $B_1$ is present as thiamine nitrate.

Similarly, vitamin $B_6$ can be included in the solid dosage forms of the invention in any suitable form such as pyridoxine hydrochloride or pyridoxine active form, i.e. pyridoxal phosphate.

As regards vitamin $B_{12}$, it may also be included in the solid dosage forms of the invention in any suitable form known in the art such as cyanocobalamin, hydroxycobalamin or methylcobalamin. Preferably, vitamin $B_{12}$ is cyanocobalamin or hydroxycobalamin; more preferably, vitamin $B_{12}$ is cyanocobalamin.

In a preferred embodiment of the multilayer pharmaceutical or nutraceutical solid dosage forms of the invention, the second layer comprises vitamin $B_{12}$ as cyanocobalamin. More preferably, the second layer comprises vitamin $B_{12}$ as cyanocobalamin and vitamin $B_6$ as pyridoxine hydrochloride. In an alternative embodiment, the second layer may comprise vitamin $B_{12}$ as cyanocobalamin and vitamin $B_1$ as thiamine hydrochloride or thiamine nitrate; more preferably, the second layer may comprise vitamin $B_{12}$ as cyanocobalamin and vitamin $B_1$ as thiamine nitrate. In a preferred embodiment, the second layer of the solid dosage forms of the invention may comprise vitamin $B_{12}$ as cyanocobalamin, $B_6$ vitamin as pyridoxine hydrochloride and vitamin $B_1$ as thiamine hydrochloride or thiamine nitrate. Preferably, the second layer of the solid dosage forms of the invention may comprise vitamin $B_{12}$ as cyanocobalamin, $B_6$ vitamin as pyridoxine hydrochloride and vitamin $B_1$ as thiamine nitrate.

Optionally, vitamins $B_1$ and $B_6$ may be provided in microencapsulated form to ensure still further resistance to degradation. In the context of the present invention, it will be apparent for the skilled person that any suitable microencapsulated vitamin $B_1$ or $B_6$ commercially available can be readily incorporated into the multilayer pharmaceutical or nutraceutical solid dosage form of the invention. By way of illustration, vitamins $B_1$ and $B_6$ can be provided in encapsulated form with capsules comprising maltodextrin and palm oil mono- and/or diglycerides, such as commercially available "CapsuDar® $B_1$-33 LP nitrate" or "CapsuDar® $B_6$-33 LP nitrate" microencapsulated products, which contain thiamine mononitrate or pyridoxine hydrochloride, respectively, and maltodextrin and mono- and diglycerides from palm oil as coating agents.

In a preferred embodiment, the invention provides a multilayer pharmaceutical or nutraceutical solid dosage form for oral administration comprising:
- a first layer comprising a first pyrimidine derivative or any salt or solvate thereof, and a second pyrimidine derivative or any salt or solvate thereof; and
- a second layer comprising at least one vitamin selected from the group consisting of B-group vitamins.

In a more preferred embodiment, the invention provides a multilayer pharmaceutical or nutraceutical solid dosage form for oral administration comprising:
- a first layer comprising at least two pyrimidine derivatives selected from uridine, uridine phosphates, cytidine, cytidine phosphates, thymidine, thymidine phosphates or any salt or solvate thereof; and
- a second layer comprising at least one B-group vitamin selected from the group consisting of vitamins $B_1$, $B_6$ and $B_{12}$.

In another preferred embodiment, the invention provides a multilayer pharmaceutical or nutraceutical solid dosage form for oral administration comprising:
- a first layer comprising at least two pyrimidine derivatives selected from uridine, uridine phosphates, cytidine, cytidine phosphates or any salt or solvate thereof; and
- a second layer comprising at least one B-group vitamin selected from the group consisting of vitamins $B_1$, $B_6$ and $B_{12}$.

In a still more preferred embodiment, the invention provides a multilayer pharmaceutical or nutraceutical solid dosage form for oral administration comprising:
- a first layer comprising at least two pyrimidine derivatives selected from uridine phosphates, cytidine phosphates, thymidine phosphates or any salt or solvate thereof; and
- a second layer comprising at least one B-group vitamin selected from the group consisting of vitamins $B_1$, $B_6$ and $B_{12}$.

In a still even more preferred embodiment, the invention provides a multilayer pharmaceutical or nutraceutical solid dosage form for oral administration comprising:
- a first layer comprising at least two pyrimidine derivatives selected from uridine phosphates, cytidine phosphates or any salt or solvate thereof; and
- a second layer comprising at least one B-group vitamin selected from the group consisting of vitamins $B_1$, $B_6$ and $B_{12}$.

In an even more preferred embodiment, the first layer of the multilayer pharmaceutical or nutraceutical solid dosage form for oral administration may comprise at least two pyrimide derivatives which can be, for example, a uridine phosphate and a cytidine salt; a uridine phosphate and a cytidine phosphate salt; a uridine salt and a cytidine phosphate; a uridine phosphate salt and a cytidine phosphate; a uridine phosphate and a cytidine phosphate; or a uridine salt and a cytidine salt; a uridine phosphate salt and a cytidine phosphate salt. Still more preferably, the first layer of the multilayer pharmaceutical or nutraceutical solid dosage form for oral administration may comprise uridine monophosphate and cytidine monophosphate, each one of them either in salt (e.g. UMP·2Na or CMP·2Na) or acid form.

In another preferred embodiment, the invention provides a multilayer pharmaceutical or nutraceutical solid dosage form for oral administration comprising:
- a first layer comprising at least two pyrimidine derivatives selected from uridine phosphates, cytidine phosphates or any salt or solvate thereof; and
- a second layer comprising vitamin $B_{12}$.

This preferred solid dosage form may also preferably comprise vitamin $B_1$ and/or vitamin $B_6$ in the second layer. In another preferred embodiment, this solid dosage form may comprise vitamin $B_1$ and vitamin $B_{12}$.

The multilayer pharmaceutical or nutraceutical solid dosage form of the invention can be provided several in different forms such as a multilayer tablet, which can be a laminated multilayer tablet (such as a bilayer or trilayer tablet) or a concentric multilayer tablet (also known as tablet into tablet) or compression-coated tablet; a concentric layered bead; or a film-coated tablet, bead, granule or pellet. Preferably, the multilayer pharmaceutical or nutraceutical solid dosage form of the invention is provided in the form a laminated multilayer tablet.

On the other hand, it will also be apparent for the skilled person that the multilayer pharmaceutical or nutraceutical solid dosage form is not limited to the presence of two layers only (i.e. a bilayer pharmaceutical or nutraceutical solid dosage form), but may be straightforwardly adapted to contain a number of layers higher than two.

By way of illustration, according to another preferred embodiment, the present invention provides a multilayer pharmaceutical or nutraceutical solid dosage form for oral administration comprising:
- a first layer comprising at least one pyrimidine derivative or any salt or solvate thereof;
- a second layer comprising at least one vitamin selected from the group consisting of B-group vitamins; and
- a third layer comprising at least one suitable pharmaceutical or nutraceutical excipient respectively.

In this exemplary embodiment of the invention, the third layer may be placed in adjacent position to either the first layer or the second layer, or alternatively, it may be placed adjacent to both.

By "pharmaceutical or nutraceutical excipient", as used herein, it is understood any substance known in the art such as diluents, binders, colouring agents, flavouring agents, surfactants, lubricants/glidants or plasticizers for pharmaceutical or nutraceutical compositions, respectively.

It will also become apparent for the skilled person that any of the layers present in the multilayer pharmaceutical or nutraceutical solid dosage forms of the invention may optionally comprise at least one suitable pharmaceutical or nutraceutical excipient, respectively, as defined above.

Examples of suitable excipients include, but are not limited to, suitable binders, of which dry binders are preferred, and which may include cellulose powder and microcrystalline cellulose. Suitable disintegrants are e.g. sodium starch glycolate, crospovidone, croscarmellose, sodium carboxymethylcellulose and dried corn starch. Lactose (e.g. anhydrous lactose) may also be used as a suitable filler.

Suitable binders and carriers may also include, among others, cellulose powder, microcrystalline cellulose, cellulose derivatives like hydroxymethylcellulose, hydroxyethylcellulose, hydroxypropylcellulose and hydroxypropylmethylcellulose, dibasic calcium phosphate, corn starch, pregelatinized starch and polyvinyl pyrrolidone (povidone). Lubricants such as stearic acid, magnesium stearate, sodium stearylfumarate and glycerol tribehenate, may also be advantageously used.

Other suitable excipients which may be used in the solid dosage forms of the invention include, in a non-limiting manner: flow control agents such as colloidal silicon dioxide (also known as colloidal silica; e.g. AEROSIL®) or talc; colouring agents including dyes and pigments such as iron oxide red or yellow or titanium dioxide; pH control agents such as citric acid, tartaric acid, fumaric acid, sodium citrate, dibasic calcium phosphate, dibasic sodium phosphate, etc.

In another embodiment, the invention provides a multilayer pharmaceutical or nutraceutical solid dosage form for oral administration wherein the first layer comprises at least one pyrimidine derivative or any salt or solvate thereof, and at least one purine derivative or any salt or solvate thereof. Preferably, the invention provides a multilayer pharmaceutical or nutraceutical solid dosage form for oral administration wherein the first layer comprises at least one pyrimidine derivative or any salt or solvate thereof which is selected from the group consisting of uridine, uridine esters, uridine phosphates, cytidine, cytidine esters, cytidine phosphates, thymidine, thymidine esters, thymidine phosphates and any salt or solvate thereof, and at least one purine derivative or any salt or solvate thereof which is selected from the group consisting of adenosine, adenosine esters, adenosine phosphates, guanosine, guanosine esters, guanosine phosphates, inosine, inosine esters, inosine phosphates, xanthosine, xanthosine esters, xanthosine phosphates and any salt or solvate thereof. More preferably, the invention provides a multilayer pharmaceutical or nutraceutical solid dosage form for oral administration wherein the first layer comprises at least one pyrimidine derivative or any salt or solvate thereof which is selected from the group consisting of uridine, uridine phosphates, cytidine, cytidine phosphates, thymidine, thymidine phosphates and any salt or solvate thereof, and at least one purine derivative or any salt or solvate thereof which is selected from the group consisting of adenosine, adenosine phosphates, guanosine, guanosine phosphates, inosine, inosine phosphates, xanthosine, xanthosine phosphates and any salt or solvate thereof. Still more preferably, the invention provides a multilayer pharmaceutical or nutraceutical solid dosage form for oral administration wherein the first layer comprises at least one pyrimidine derivative or any salt or solvate thereof which is selected from the group consisting of uridine, uridine phosphates, cytidine, cytidine phosphates, thymidine, thymidine phosphates and any salt or solvate thereof, and at least one purine derivative or any salt or solvate thereof which is selected from the group consisting of adenosine, adenosine phosphates, guanosine, guanosine phosphates and any salt or solvate thereof. Still even more preferably, the invention provides a multilayer pharmaceutical or nutraceutical solid dosage form for oral administration wherein the first layer comprises at least one pyrimidine derivative or any salt or solvate thereof which is selected from the group consisting of uridine, uridine phosphates, cytidine, cytidine phosphates, thymidine, thymidine phosphates and any salt or solvate thereof, and at least one purine derivative or any salt or solvate thereof which is selected from the group consisting of adenosine, adenosine phosphates and any salt or solvate thereof. Still even much more preferably, the invention provides a multilayer pharmaceutical or nutraceutical solid dosage form for oral administration wherein the first layer comprises at least one pyrimidine derivative or any salt or solvate thereof which is selected from the group consisting of uridine, uridine phosphates, cytidine, cytidine phosphates and any salt or solvate thereof, and at least one purine derivative or any salt or solvate thereof which is selected from the group consisting of adenosine, adenosine phosphates and any salt or solvate thereof.

According to another embodiment, the invention provides a multilayer pharmaceutical or nutraceutical solid dosage form for oral administration wherein the first layer comprises at least one purine derivative or any salt or solvate thereof. Preferably, the invention provides a multilayer pharmaceutical or nutraceutical solid dosage form for oral administration wherein the first layer comprises at least one purine derivative or any salt or solvate thereof which is selected from the group consisting of adenosine, adenosine esters, adenosine phosphates, guanosine, guanosine esters, guanosine phosphates, inosine, inosine esters, inosine phosphates, xanthosine, xanthosine esters, xanthosine phosphates and any salt or solvate thereof. More preferably, the invention provides a multilayer pharmaceutical or nutraceutical solid dosage form for oral administration wherein the first layer comprises at least one purine derivative or any salt or solvate thereof which is selected from the group consisting of adenosine, adenosine phosphates, guanosine, guanosine phosphates, inosine, inosine phosphates, xanthosine, xanthosine phosphates and any salt or solvate thereof. Still more preferably, the invention provides a multilayer pharmaceutical or nutraceutical solid dosage form for oral administration wherein the first layer comprises at least one purine derivative or any salt or solvate thereof which is selected from the group consisting of adenosine, adenosine phosphates, guanosine, guanosine phosphates and any salt or solvate thereof. Still even more preferably, the invention provides a multilayer pharmaceutical or nutraceutical solid dosage form for oral administration wherein the first layer comprises at least one purine derivative or any salt or solvate thereof which is selected from the group consisting of adenosine, adenosine phosphates and any salt or solvate thereof.

The multilayer pharmaceutical or nutraceutical solid dosage forms herein provided advantageously provide high amounts of pyrimidine derivatives and/or purine derivatives, in particular, pyrimidine and/or purine nucleotides or nucleosides, so that an optimal approach for peripheral nerve injuries repair can be achieved. Due to this fact, the solid dosage forms of the present invention also contribute to the reduction of the patient's lack of compliance in cases wherein, due to the severity of the condition, large amounts of nucleotides or nucleosides and B vitamins are required, and for which a variable number of tablets per day is usually prescribed.

In a preferred embodiment, the abovedescribed multilayer pharmaceutical or nutraceutical solid dosage forms of the invention comprise a total amount of at least 200 mg, more preferably a total amount in the range of from 200 mg to 450 mg, more preferably in the range of from 250 mg to 430 mg, still more preferably in the range of from 300 mg to 420 mg, even more preferably in the range of from 350 mg to 410 mg of said pyrimidine derivative(s), purine derivative(s) and any salt or solvate thereof, wherein the total amount is calculated considering the corresponding equivalent base form(s) of each of said pyrimidine derivative(s), purine derivative(s) and salt(s) or solvate(s) thereof.

In a particular embodiment, the abovedescribed multilayer pharmaceutical or nutraceutical solid dosage forms of the invention may comprise a total amount of at least 200 mg, more preferably a total amount in the range of from 200 mg to 450 mg, still more preferably in the range of from 250 mg to 450 mg, still even more preferably in the range of from 250 mg to 430 mg, much more preferably in the range of from 300 mg to 420 mg, and even more preferably in the range of from 350 mg to 410 mg of said pyrimidine derivative(s), purine derivative(s) and any salt, or solvate thereof, wherein the total amount is calculated considering the corresponding equivalent base form(s) of each of said pyrimidine derivative(s) and salt(s) or solvate(s) thereof.

Also, according to another embodiment, the abovedescribed multilayer pharmaceutical or nutraceutical solid dosage forms of the invention may comprise a total amount of at least 200 mg, more preferably a total amount in the range of from 200 mg to 450 mg, still more preferably in the range of from 250 mg to 450 mg, still even more preferably in the range of from 250 mg to 430 mg, much more preferably in the range of from 300 mg to 420 mg, and even much more preferably in the range of from 350 mg to 410 mg of said purine derivative(s) and any salt or solvate thereof, wherein the total amount is calculated considering the corresponding equivalent base form(s) of each of said purine derivative(s) and salt(s) or solvate(s) thereof.

In a preferred embodiment according to the first aspect of the invention, the multilayer pharmaceutical or nutraceutical solid dosage form is stable after being stored at 25° C. and 60% relative humidity for a period of at least 3 months, preferably for a period of at least 6 months, more preferably for a period of at least 12 months.

In another preferred embodiment, the multilayer pharmaceutical or nutraceutical solid dosage form provided according to the first aspect of the invention is stable after being stored at 40° C. and 75% relative humidity for a period of at least 3 months, preferably for a period of at least 6 months.

In still another preferred embodiment, the multilayer pharmaceutical or nutraceutical solid dosage form according to the first aspect of the invention is stable after being stored at 25° C. and 60% relative humidity for a period of at least 3 months, more preferably at 25° C. and 60% relative humidity for a period of at least 6 months, still more preferably at 25° C. and 60% relative humidity fora period of at least 12 months, when packed in a PVC/PVDC polyvinylchloride/polyvinyldichloride) blister in aluminium foil.

The present invention provides a multilayer pharmaceutical or nutraceutical solid dosage form with enhanced resistance to moisture and/or acidic conditions, which advantageously requires less restricted storage conditions, thus allowing to store the product at temperatures and relative humidity higher than those of currently marketed formulations. In this regard, the technical solution of the invention provides excellent stability results even when PVC/PVDC blisters in aluminium foil were used, which are known in the art to be partly permeable to moisture.

As used herein, the term "stable" refers to a relative B vitamin loss, under stability assay conditions abovedefined, equal to or less than 15% in respect of each vitamin B present in the composition; preferably a relative B vitamin loss under stability assay conditions equal to or less than 10% in respect of each vitamin B present in the composition. Said B vitamin loss can be determined by HPLC analysis. In a preferred embodiment, stability assay conditions are 25° C. and 60 HR for at least 3 months, and more preferably, 25° C. and 60 HR for at least 6 months. In another preferred embodiment, stability assay conditions are 40° C. and 75 HR for at least 3 months, and more preferably, 40° C. and 75 HR for at least 6 months. According to still another preferred embodiment, stability assay conditions further comprise the pharmaceutical or nutraceutical solid dosage form of the invention being packaged in either an Alu-Alu blister or a PVC/PVDC blister in aluminium foil; more preferably, stability assay conditions further comprise the pharmaceutical or nutraceutical solid dosage form of the invention being packaged in a PVC/PVDC blister in aluminium foil.

In a second aspect, the invention provides a method for producing the multilayer pharmaceutical or nutraceutical solid dosage forms according to the first aspect of the invention.

According to this second aspect, the invention provides a method for producing the multilayer pharmaceutical or nutraceutical solid dosage forms according to the first aspect of the invention, which comprises:
(i) providing a first layer composition comprising at least one pyrimidine derivative, purine derivative, or any salt or solvate thereof by sieving the at least one pyrimidine derivative, purine derivative, or any salt or solvate thereof and optionally at least one suitable pharmaceutical or nutraceutical excipient, and then blending the resulting mixture until homogeneity;
(ii) providing a second layer composition comprising at least one vitamin selected from the group consisting of B-group vitamins by sieving the at least one vitamin selected from the group consisting of B-group vitamins and optionally at least one suitable pharmaceutical or nutraceutical excipient, and then blending the resulting mixture until homogeneity; and
(iii) compressing one of the first or second layer composition, and then compressing the other of the first or second layer composition on or around one previous layer to form a pharmaceutical or nutraceutical solid dosage form.

In a particular embodiment, the invention provides a method for producing the multilayer pharmaceutical or nutraceutical solid dosage forms according to the first aspect of the invention which comprises:
(i) providing a first layer composition comprising at least one pyrimidine derivative or any salt or solvate thereof by sieving the at least one pyrimidine derivative or any salt or solvate thereof and optionally at least one suitable pharmaceutical or nutraceutical excipient, and then blending the resulting mixture until homogeneity;
(ii) providing a second layer composition comprising at least one vitamin selected from the group consisting of B-group vitamins and optionally at least one suitable pharmaceutical or nutraceutical excipient by sieving the at least one vitamin selected from the group consisting of B-group vitamins and optionally at least one suitable pharmaceutical or nutraceutical excipient, and then blending the resulting mixture until homogeneity; and
(iii) compressing one of the first or second layer composition, and then compressing the other of the first or second layer composition on or around the previous layer to form a pharmaceutical or nutraceutical solid dosage form.

It will become apparent for the skilled person that compression in step (iii) can be carried out in any usual manner known in the art, e.g. using high-speed rotary press, or a multilayer tableting machine, and also that the above process may be easily adapted for the different embodiments of the invention, thus also including the possibility of adding further layers to produce a multilayer dosage form.

In an optional embodiment, wherein more than one suitable pharmaceutical or nutraceutical excipient per layer may be used, sieving and blending of the resulting mixture in each step of the process can be carried out sequentially after the addition of each individual excipient or group of excipients.

In another preferred embodiment, wherein a trilayer pharmaceutical or nutraceutical solid dosage form according to the first aspect of the invention is provided, the method according to the second aspect of the invention comprises a further step wherein a third layer comprising at least one suitable pharmaceutical or nutraceutical excipient which is an inert excipient is provided. That is, according to this particular embodiment, the method according to the second aspect of the invention comprises the following steps:

(i) providing a first layer composition comprising at least one pyrimidine derivative, purine derivative, or any salt or solvate thereof by sieving the at least one pyrimidine derivative, purine derivative, or any salt or solvate thereof and optionally at least one suitable pharmaceutical or nutraceutical excipient, and then blending the resulting mixture until homogeneity;

(ii) providing a second layer composition comprising at least one vitamin selected from the group consisting of B-group vitamins by sieving the at least one vitamin selected from the group consisting of B-group vitamins and optionally at least one suitable pharmaceutical or nutraceutical excipient, and then blending the resulting mixture until homogeneity;

(iii) providing a third layer composition comprising at least one suitable pharmaceutical or nutraceutical excipient; and (iv) compressing one of the first or second layer composition and then compressing the third layer composition on or around the previous layer, followed by compressing the other of the first or second layer composition on or around the third layer composition.

In a third aspect, the invention provides another method for producing the multilayer pharmaceutical or nutraceutical solid dosage forms according to the first aspect of the invention.

Specifically, it is provided a method for producing the multilayer pharmaceutical or nutraceutical solid dosage forms according to the first aspect of the invention which comprises:

(i) providing a first layer composition comprising at least one pyrimidine derivative, purine derivative or any salt or solvate thereof by sieving the at least one pyrimidine derivative, purine derivative or any salt or solvate thereof and optionally at least one suitable pharmaceutical or nutraceutical excipient, and then blending the resulting mixture until homogeneity;

(ii) providing a second layer composition comprising at least one vitamin selected from the group consisting of B-group vitamins by sieving the at least one vitamin selected from the group consisting of B-group vitamins and then subjecting it to granulation in the presence of water; and (iii) compressing one of the first or second layer composition, and then compressing the other of the first or second layer composition on or around one previous layer to form a pharmaceutical or nutraceutical solid dosage form.

Step (ii) of the process may optionally further include blending the resulting granulate with at least one suitable pharmaceutical or nutraceutical excipient until homogeneity.

It will become apparent for the skilled person that compression in step (iii) can be carried out in any usual manner known in the art, e.g. using high-speed rotary press, or a multilayer tableting machine, and also that the above process may be easily adapted for the different embodiments of the invention, thus also including the possibility of adding further layers to produce a multilayer dosage form.

In an optional embodiment, wherein more than one suitable pharmaceutical or nutraceutical excipient per layer may be used, sieving and blending of the resulting mixture in each step can be carried out sequentially after the addition of each individual excipient or group of excipients.

According to another preferred embodiment, wherein a trilayer pharmaceutical or nutraceutical solid dosage form according to the first aspect of the invention is provided, the method according to the third aspect of the invention comprises the following steps:

(i) providing a first layer composition comprising at least one pyrimidine derivative, purine derivative, or any salt or solvate thereof by sieving the at least one pyrimidine derivative, purine derivative, or any salt or solvate thereof and optionally at least one suitable pharmaceutical or nutraceutical excipient, and then blending the resulting mixture until homogeneity;

(ii) providing a second layer composition comprising at least one vitamin selected from the group consisting of B-group vitamins by sieving the at least one vitamin selected from the group consisting of B-group vitamins and then subjecting it to granulation in the presence of water;

(iii) providing a third layer composition comprising at least one suitable pharmaceutical or nutraceutical excipient; and (iii) compressing one of the first or second layer composition and then compressing the third layer composition on or around the previous layer, followed by compressing the other of the first or second layer composition on or around the third layer composition.

In a fourth aspect, the invention provides another method for producing the multilayer pharmaceutical or nutraceutical solid dosage forms according to the first aspect of the invention, wherein the second and subsequents layers are applied onto the first layer by coating methods.

According to this fourth aspect, the invention provides a method for producing the multilayer pharmaceutical or nutraceutical solid dosage forms according to the first aspect of the invention, which comprises:

(i) providing a first layer composition comprising at least one pyrimidine derivative, purine derivative, or any salt or solvate thereof by sieving the at least one pyrimidine derivative, purine derivative, or any salt or solvate thereof and optionally at least one suitable pharmaceutical or nutraceutical excipient, then blending the resulting mixture until homogeneity, and subsequently compressing the resulting mixture to form a core;

(ii) providing a second layer composition comprising at least one vitamin selected from the group consisting of B-group vitamins and optionally at least one suitable pharmaceutical or nutraceutical excipient, wherein the ingredients are dispersed or dissolved in either water or an organic solvent to form either an aqueous or organic dispersion or solution, respectively; and (iii) applying the resulting dispersion or solution of step (ii) onto the core obtained in step (i) using coating means.

It will become apparent for the skilled person that compression in step (i) can be carried out in any usual manner known in the art, e.g. using a rotary tablet machine. Coating step (iii) may also be carried out using standard coating means known in the art, such as a coating pan.

It will be also apparent for the skilled in the art that the above coating process may be easily adapted for the different embodiments of the invention, thus also including the possibility of adding further layers to produce a multilayer dosage form.

In particular, according to this fourth aspect, the invention provides a method for producing trilayer pharmaceutical or nutraceutical solid dosage forms according to the first aspect of the invention, which comprises:

(i) providing a first layer composition comprising at least one pyrimidine derivative, purine derivative, or any salt or solvate thereof by sieving the at least one pyrimidine derivative, purine derivative, or any salt or solvate thereof and optionally at least one suitable pharmaceutical or nutraceutical excipient, then blending the resulting mixture until homogeneity, and subsequently compressing the resulting mixture to form a core;

(ii) providing a third layer composition comprising at least one suitable pharmaceutical or nutraceutical excipient; preferably, comprising at least one film-forming agent, which is more preferably selected from the group consisting of hydroxypropylmethylcellulose, polyvinyl alcohol and partially hydrolyzed polyvinyl alcohol; wherein the third layer composition is applied onto the core obtained in step (1) using coating means;

(iii) providing a second layer composition comprising at least one vitamin selected from the group consisting of B-group vitamins and optionally at least one suitable pharmaceutical or nutraceutical excipient, wherein the ingredients are dispersed or dissolved in either water or an organic solvent to form either an aqueous or organic dispersion or solution, respectively; and (iv) applying the resulting dispersion or solution of step (iii) onto the third layer obtained in step (ii) using coating means.

In a fifth aspect of the invention, a multilayer pharmaceutical or nutraceutical solid dosage form according to the first aspect of the invention is obtainable by the process according to the second aspect of the invention. In a particular embodiment, a bilayer pharmaceutical or nutraceutical solid dosage form according to the first aspect of the invention is obtainable by the process according to the second aspect of the invention. In another embodiment, a trilayer pharmaceutical or nutraceutical solid dosage form according to the first aspect of the invention is obtainable by the process according to the second aspect of the invention.

In a preferred embodiment, a multilayer pharmaceutical or nutraceutical solid dosage form according to the first aspect of the invention is obtained by the process according to the second aspect of the invention. In a particular embodiment, a bilayer pharmaceutical or nutraceutical solid dosage form according to the first aspect of the invention is obtained by the process according to the second aspect of the invention. In another embodiment, a trilayer pharmaceutical or nutraceutical solid dosage form according to the first aspect of the invention is obtained by the process according to the second aspect of the invention.

In a sixth aspect of the invention, a multilayer pharmaceutical or nutraceutical solid dosage form according to the first aspect of the invention is obtainable by the process according to the third aspect of the invention. In a particular embodiment, a bilayer pharmaceutical or nutraceutical solid dosage form according to the first aspect of the invention is obtainable by the process according to the third aspect of the invention. In another embodiment, a trilayer pharmaceutical or nutraceutical solid dosage form according to the first aspect of the invention is obtainable by the process according to the third aspect of the invention.

In a preferred embodiment, a multilayer pharmaceutical or nutraceutical solid dosage form according to the first aspect of the invention is obtained by the process according to the third aspect of the invention. In a particular embodiment, a bilayer pharmaceutical or nutraceutical solid dosage form according to the first aspect of the invention is obtained by the process according to the third aspect of the invention. In another embodiment, a trilayer pharmaceutical or nutraceutical solid dosage form according to the first aspect of the invention is obtained by the process according to the third aspect of the invention.

In a seventh aspect of the invention, a multilayer pharmaceutical or nutraceutical solid dosage form according to the first aspect of the invention is obtainable by the process according to the fourth aspect of the invention. In a particular embodiment, a bilayer pharmaceutical or nutraceutical solid dosage form according to the first aspect of the invention is obtainable by the process according to the fourth aspect of the invention. In another embodiment, a trilayer pharmaceutical or nutraceutical solid dosage form according to the first aspect of the invention is obtainable by the process according to the fourth aspect of the invention.

In a preferred embodiment, a multilayer pharmaceutical or nutraceutical solid dosage form according to the first aspect of the invention is obtained by the process according to the fourth aspect of the invention. In a particular embodiment, a bilayer pharmaceutical or nutraceutical solid dosage form according to the first aspect of the invention is obtained by the process according to the fourth aspect of the invention. In another embodiment, a trilayer pharmaceutical or nutraceutical solid dosage form according to the first aspect of the invention is obtained by the process according to the fourth aspect of the invention.

In a eighth aspect of the invention, a multilayer pharmaceutical or nutraceutical solid dosage form according to the first aspect of the invention is provided for the manufacture of a medicament or a nutraceutical product, respectively, for the treatment and/or prevention of peripheral neuropathy.

By "peripheral neuropathy", it is understood any condition in which the peripheral nervous system is damaged, such as peripheral polyneuropathy, peripheral radiculopathy, causalgia and reflex sympathetic dystrophy, post-mastectomy neuralgia, post-surgical neuralgia and pain, vulvar vestibulitis, phantom limb pain, thalamic syndrome (central post-stroke pain), temporo mandibular joint syndrome, metatarsalgia (Morton's neuralgia) and neurogenic pain from nerve compression caused, for example, by a prolapsed intervertebral disc or carpal and tarsal tunnel syndromes.

In a ninth aspect of the invention, it is provided a multilayer pharmaceutical or nutraceutical solid dosage form according to the first aspect of the invention for use in the treatment and/or prevention of peripheral neuropathy.

In an tenth aspect of the invention, the use of a multilayer nutraceutical solid dosage form according to the first aspect of the invention in the treatment and/or prevention of peripheral neuropathy is provided.

Further aspects and embodiments of the present invention are described in the following clauses below:

1. A multilayer pharmaceutical or nutraceutical solid dosage form for oral administration comprising:
   a first layer comprising at least one pyrimidine derivative, purine derivative or any salt or solvate thereof; and
   a second layer comprising at least one vitamin selected from the group consisting of B-group vitamins.

2. The multilayer pharmaceutical or nutraceutical solid dosage form according to clause 1, wherein:
   the first layer comprises at least one pyrimidine derivative or any salt or solvate thereof; and
   the second layer comprises at least one vitamin selected from the group consisting of B-group vitamins.

3. The multilayer pharmaceutical or nutraceutical solid dosage form according to clause 1 or 2, wherein the at least one pyrimidine derivative is selected from the group consisting of uridine, uridine esters, uridine phosphates, cytidine, cytidine esters, cytidine phosphates, thymidine, thymidine esters and thymidine phosphates.
4. The multilayer pharmaceutical or nutraceutical solid dosage form according to any preceding clause, wherein the at least one pyrimidine derivative is selected from the group consisting of uridine, uridine phosphates, cytidine, cytidine phosphates, thymidine and thymidine phosphates.
5. The multilayer pharmaceutical or nutraceutical solid dosage form according to any preceding clause, wherein the at least one pyrimidine derivative is selected from the group consisting of uridine phosphates, cytidine phosphates and thymidine phosphates.
6. The multilayer pharmaceutical or nutraceutical solid dosage form according to any preceding clause, wherein the at least one pyrimidine derivative is a uridine phosphate selected from the group consisting of uridine monophosphates, uridine diphosphates and uridine triphosphates, or the at least one pyrimidine derivative is a cytidine phosphate selected from the group consisting of cytidine monophosphates, cytidine diphosphates and cytidine triphosphates, or the at least one pyrimidine derivative is a thymidine phosphate selected from the group consisting of thymidine monophosphates, thymidine diphosphates and thymidine triphosphates.
7. The multilayer pharmaceutical or nutraceutical solid dosage form according to any preceding clause, wherein the at least one purine derivative is selected from the group consisting of adenosine, adenosine esters, adenosine phosphates, guanosine, guanosine esters, guanosine phosphates, inosine, inosine esters, inosine phosphates, xanthosine, xanthosine esters and xanthosine phosphates.
8. The multilayer pharmaceutical or nutraceutical solid dosage form according to any preceding clause, wherein the at least one purine derivative is selected from the group consisting of adenosine phosphates, guanosine phosphates, inosine phosphates and xanthosine phosphates.
9. The multilayer pharmaceutical or nutraceutical solid dosage form according to any preceding clause, wherein the at least one purine derivative is an adenosine phosphate selected from the group consisting of adenosine monophosphates, adenosine diphosphates and adenosine triphosphates, or the at least one purine derivative is a guanosine phoshate selected from the group consisting of guanosine monophosphates, guanosine diphosphates and guanosine triphosphates, or the at least one purine derivative is an inosine phosphate selected from the group consisting of inosine monophosphates, inosine diphosphates and inosine triphosphates, or the at least one purine derivative is a xanthosine phosphate selected from the group consisting of xanthosine monophosphates, xanthosine diphosphates and xanthosine triphosphates.
10. The multilayer pharmaceutical or nutraceutical solid dosage form according to clause 1, wherein the at least one pyrimidine derivative, purine derivative, or any salt or solvate thereof is selected from the group consisting of uridine, uridine esters, uridine phosphates, cytidine, cytidine esters, cytidine phosphates, thymidine, thymidine esters, thymidine phosphates, adenosine, adenosine esters, adenosine phosphates, guanosine, guanosine esters, guanosine phosphates, inosine, inosine esters, inosine phosphates, xanthosine, xanthosine esters, xanthosine phosphates and any salt or solvate thereof.
11. The multilayer pharmaceutical or nutraceutical solid dosage form according to clause 10, wherein the at least one pyrimidine derivative, purine derivative, or any salt or solvate thereof is selected from the group consisting of uridine, uridine phosphates, cytidine, cytidine phosphates, thymidine, thymidine phosphates, adenosine, adenosine phosphates, guanosine, guanosine phosphates, inosine, inosine phosphates, xanthosine, xanthosine phosphates and any salt or solvate thereof.
12. The multilayer pharmaceutical or nutraceutical solid dosage form according to clause 10 or 11, wherein the at least one pyrimidine derivative, purine derivative, or any salt or solvate thereof is selected from the group consisting of uridine, uridine phosphates, cytidine, cytidine phosphates, thymidine, thymidine phosphates, adenosine, adenosine phosphates, guanosine, guanosine phosphates and any salt or solvate thereof.
13. The multilayer pharmaceutical or nutraceutical solid dosage form according to any of clauses 10-12, wherein the at least one pyrimidine derivative, purine derivative, or any salt or solvate thereof is selected from the group consisting of uridine, uridine phosphates, cytidine, cytidine phosphates, thymidine, thymidine phosphates, adenosine, adenosine phosphates and any salt or solvate thereof.
14. The multilayer pharmaceutical or nutraceutical solid dosage form according to any preceding clause, wherein the first layer comprises at least one pyrimidine derivative salt and/or at least one purine derivative salt which is selected from the group consisting of alkali metal salts, alkaline earthmetal salts, basic amino acid salts, ammonium salts, alkanolamine salts or any mixture thereof.
15. The multilayer pharmaceutical or nutraceutical solid dosage form according to any preceding clause, wherein the first layer comprises at least one pyrimidine derivative salt and/or at least one purine derivative salt which is selected from the group consisting of alkali metal salts, alkaline earthmetal salts, basic aminoacid salts, ammonium salts or any mixture thereof.
16. The multilayer pharmaceutical or nutraceutical solid dosage form according to any preceding clause, wherein the first layer comprises at least one pyrimidine derivative salt and/or at least purine derivative salt which is selected from the group consisting of alkali metal salts, alkaline earthmetal salts or any mixture thereof.
17. The multilayer pharmaceutical or nutraceutical solid dosage form according to any preceding clause, wherein the first layer comprises at least one pyrimidine derivative salt and/or at least one purine derivative salt which is an alkali metal salt.
18. The multilayer pharmaceutical or nutraceutical solid dosage form according to any preceding clause, wherein the first layer comprises at least one pyrimidine derivative salt which is an alkali metal salt selected from the group consisting of cytidine monophosphate monosodium, cytidine diphosphate disodium, cytidine triphosphate trisodium, uridine monophosphate monosodium, uridine diphosphate disodium, uridine triphosphate trisodium, thymidine monophosphate monosodium, thymidine diphosphate disodium and thymidine triphosphate trisodium.
19. The multilayer pharmaceutical or nutraceutical solid dosage form according to any preceding clause, wherein the first layer comprises at least one purine derivative salt which is an alkali metal salt selected from the group consisting of adenosine monophosphate monosodium, adenosine diphosphate disodium, adenosine triphosphate trisodium, guanosine monophosphate monosodium, guanosine diphosphate disodium, guanosine triphosphate trisodium, inosine monophosphate monosodium, inosine diphosphate disodium, inosine triphosphate trisodium, xanthosine monophosphate monosodium, xanthosine diphosphate disodium and xanthosine triphosphate trisodium.
20. The multilayer pharmaceutical or nutraceutical solid dosage form according to any preceding clause, wherein the at least one vitamin selected from the group consisting of B-group vitamins of the second layer is vitamin $B_1$, $B_6$ or $B_{12}$.
21. The multilayer pharmaceutical or nutraceutical solid dosage form according to any preceding clause, wherein the at least one vitamin selected from the group consisting of B-group vitamins of the second layer is vitamin $B_{12}$.
22. The multilayer pharmaceutical or nutraceutical solid dosage form according to any preceding clause, wherein the at least one vitamin selected from the group consisting of B-group vitamins of the second layer is vitamin $B_{12}$ in the form of cyanocobalamin, hydroxycobalamin or methylcobalamin.
23. The multilayer pharmaceutical or nutraceutical solid dosage form according to any preceding clause, wherein the at least one vitamin selected from the group consisting of B-group vitamins of the second layer is vitamin $B_{12}$ in the form of cyanocobalamin or hydroxycobalamin.
24. The multilayer pharmaceutical or nutraceutical solid dosage form according to any preceding clause, wherein the at least one vitamin selected from the group consisting of B-group vitamins of the second layer is vitamin $B_{12}$ in the form of cyanocobalamin.
25. The multilayer pharmaceutical or nutraceutical solid dosage form according to any of clauses 21-24, wherein the second layer further comprises vitamin $B_1$.
26. The multilayer pharmaceutical or nutraceutical solid dosage form according to the preceding clause, wherein vitamin $B_1$ is in the form of thiamine hydrochloride, thiamine nitrate, thiamine pyrophosphate or thiamine monophosphate chloride dihydrate.
27. The multilayer pharmaceutical or nutraceutical solid dosage form according to clause 25 or 26, wherein vitamin $B_1$ is thiamine nitrate.
28. The multilayer pharmaceutical or nutraceutical solid dosage form according to any of clauses 21-27, wherein the second layer further comprises $B_6$ vitamin.
29. The multilayer pharmaceutical or nutraceutical solid dosage form according to the preceding clause, wherein $B_6$ vitamin is in the form of pyridoxine hydrochloride or pyridoxal phosphate.
30. The multilayer pharmaceutical or nutraceutical solid dosage form according to clause 20, wherein the second layer comprises vitamins $B_1$, $B_6$ and $B_{12}$.
31. The multilayer pharmaceutical or nutraceutical solid dosage form according to the preceding clause, wherein the second layer comprises vitamin $B_{12}$ in the form of cyanocobalamin, vitamin $B_6$ in the form of pyridoxine hydrochloride and vitamin $B_1$ in the form of thiamine hydrochloride or thiamine nitrate.
32. The multilayer pharmaceutical or nutraceutical solid dosage form according to the preceding clause, wherein the second layer comprises vitamin $B_{12}$ in the form of cyanocobalamin, vitamin $B_6$ in the form of pyridoxine hydrochloride and vitamin $B_1$ in the form of thiamine nitrate.
33. The multilayer pharmaceutical or nutraceutical solid dosage form according to any of clauses 1-3, wherein the first layer comprises a first pyrimidine derivative or any salt or solvate thereof, and a second pyrimidine derivative or any salt or solvate thereof.
34. The multilayer pharmaceutical or nutraceutical solid dosage form according to the preceding clause, wherein the first and the second pyrimidine derivatives are independently selected from the group consisting of uridine, uridine phosphates, cytidine, cytidine phosphates, thymidine, thymidine phosphates or any salt or solvate thereof.
35. The multilayer pharmaceutical or nutraceutical solid dosage form according to clause 33 or 34, wherein the first and the second pyrimidine derivatives are independently selected from the group consisting of uridine, uridine phosphates, cytidine, cytidine phosphates or any salt or solvate thereof.
36. The multilayer pharmaceutical or nutraceutical solid dosage form according to any clause 33-35, wherein the first and the second pyrimidine derivatives are independently selected from the group consisting of uridine phosphates, cytidine phosphates or any salt or solvate thereof.
37. The multilayer pharmaceutical or nutraceutical solid dosage form according to any preceding clause 33-36, wherein the first and the second pyrimidine derivatives are a uridine phosphate and a cytidine phosphate salt.
38. The multilayer pharmaceutical or nutraceutical solid dosage form according to any preceding clause 33-36, wherein the first and the second pyrimidine derivatives are a uridine phosphate salt and a cytidine phosphate.
39. The multilayer pharmaceutical or nutraceutical solid dosage form according to any preceding clause 33-36, wherein the first and the second pyrimidine derivatives are a uridine phosphate salt and a cytidine phosphate salt.
40. The multilayer pharmaceutical or nutraceutical solid dosage form according to any preceding clause 33-36, wherein the first and the second pyrimidine derivatives are a uridine phosphate and a cytidine phosphate.
41. The multilayer pharmaceutical or nutraceutical solid dosage form according to the preceding clause, wherein the first and the second pyrimidine derivatives are uridine monophosphate and cytidine monophosphate, wherein each one of them is either in salt form or in acid form.
42. The multilayer pharmaceutical or nutraceutical solid dosage form according to clause 40 or 41, wherein the first and the second pyrimidine derivatives are uridine monophosphate disodium and cytidine monophosphate in acid form.
43. The multilayer pharmaceutical or nutraceutical solid dosage form according to clause 40 or 41, wherein the first and the second pyrimidine derivatives are uridine monophosphate disodium and cytidine monophosphate disodium.
44. The multilayer pharmaceutical or nutraceutical solid dosage form according to any of clauses 33-43, wherein the at least one vitamin selected from the group consisting of B-group vitamins of the second layer is vitamin $B_1$, $B_6$ or $B_{12}$.

45. The multilayer pharmaceutical or nutraceutical solid dosage form according to any of clauses 33-44, wherein the at least one vitamin selected from the group consisting of B-group vitamins of the second layer is vitamin $B_{12}$.
46. The multilayer pharmaceutical or nutraceutical solid dosage form according to any of clauses 33-45, wherein the at least one vitamin selected from the group consisting of B-group vitamins of the second layer is vitamin $B_{12}$ in the form of cyanocobalamin, hydroxycobalamin or methylcobalamin.
47. The multilayer pharmaceutical or nutraceutical solid dosage form according to any of clauses 33-46, wherein the at least one vitamin selected from the group consisting of B-group vitamins of the second layer is vitamin $B_{12}$ in the form of cyanocobalamin or hydroxycobalamin.
48. The multilayer pharmaceutical or nutraceutical solid dosage form according to any of clauses 33-47, wherein the at least one vitamin selected from the group consisting of B-group vitamins of the second layer is vitamin $B_{12}$ in the form of cyanocobalamin.
49. The multilayer pharmaceutical or nutraceutical solid dosage form according to any of clauses 45-48, wherein the second layer further comprises vitamin $B_1$.
50. The multilayer pharmaceutical or nutraceutical solid dosage form according to the preceding clause, wherein vitamin $B_1$ is in the form of thiamine hydrochloride, thiamine nitrate, thiamine pyrophosphate or thiamine monophosphate chloride dihydrate.
51. The multilayer pharmaceutical or nutraceutical solid dosage form according to clause 49 or 50, wherein vitamin $B_1$ is thiamine nitrate.
52. The multilayer pharmaceutical or nutraceutical solid dosage form according to any of clauses 45-51, wherein the second layer further comprises $B_6$ vitamin.
53. The multilayer pharmaceutical or nutraceutical solid dosage form according to the preceding clause, wherein $B_6$ vitamin is in the form of pyridoxine hydrochloride or pyridoxal phosphate.
54. The multilayer pharmaceutical or nutraceutical solid dosage form according to clause 44, wherein the second layer comprises vitamins $B_1$, $B_6$ and $B_{12}$.
55. The multilayer pharmaceutical or nutraceutical solid dosage form according to the preceding clause, wherein the second layer comprises vitamin $B_{12}$ in the form of cyanocobalamin, vitamin $B_6$ in the form of pyridoxine hydrochloride and vitamin $B_1$ in the form of thiamine hydrochloride or thiamine nitrate.
56. The multilayer pharmaceutical or nutraceutical solid dosage form according to the preceding clause, wherein the second layer comprises vitamin $B_{12}$ in the form of cyanocobalamin, vitamin $B_6$ in the form of pyridoxine hydrochloride and vitamin $B_1$ in the form of thiamine nitrate.
57. The multilayer pharmaceutical or nutraceutical solid dosage form according to clause 1 or 2, wherein the first layer comprises at least one pyrimidine derivative or any salt or solvate thereof, and at least one purine derivative or any salt or solvate thereof.
58. The multilayer pharmaceutical or nutraceutical solid dosage form according to clause 57, wherein the first layer comprises at least one pyrimidine derivative or any salt or solvate thereof which is selected from the group consisting of uridine, uridine esters, uridine phosphates, cytidine, cytidine esters, cytidine phosphates, thymidine, thymidine esters, thymidine phosphates and any salt or solvate thereof, and at least one purine derivative or any salt or solvate thereof which is selected from the group consisting of adenosine, adenosine esters, adenosine phosphates, guanosine, guanosine esters, guanosine phosphates, inosine, inosine esters, inosine phosphates, xanthosine, xanthosine esters, xanthosine phosphates and any salt or solvate thereof.
59. The multilayer pharmaceutical or nutraceutical solid dosage form according to clause 57 or 58, wherein the first layer comprises at least one pyrimidine derivative or any salt or solvate thereof which is selected from the group consisting of uridine, uridine phosphates, cytidine, cytidine phosphates, thymidine, thymidine phosphates and any salt or solvate thereof, and at least one purine derivative or any salt or solvate thereof which is selected from the group consisting of adenosine, adenosine phosphates, guanosine, guanosine phosphates, inosine, inosine phosphates, xanthosine, xanthosine phosphates and any salt or solvate thereof.
60. The multilayer pharmaceutical or nutraceutical solid dosage form according to any of clauses 57-59, wherein the first layer comprises at least one pyrimidine derivative or any salt or solvate thereof which is selected from the group consisting of uridine, uridine phosphates, cytidine, cytidine phosphates, thymidine, thymidine phosphates and any salt or solvate thereof, and at least one purine derivative or any salt or solvate thereof which is selected from the group consisting of adenosine, adenosine phosphates, guanosine, guanosine phosphates and any salt or solvate thereof.
61. The multilayer pharmaceutical or nutraceutical solid dosage form according to any of clauses 57-60, wherein the first layer comprises at least one pyrimidine derivative or any salt or solvate thereof which is selected from the group consisting of uridine, uridine phosphates, cytidine, cytidine phosphates, thymidine, thymidine phosphates and any salt or solvate thereof, and at least one purine derivative or any salt or solvate thereof which is selected from the group consisting of adenosine, adenosine phosphates and any salt or solvate thereof.
62. The multilayer pharmaceutical or nutraceutical solid dosage form according to any of clauses 57-61, wherein the first layer comprises at least one pyrimidine derivative or any salt or solvate thereof which is selected from the group consisting of uridine, uridine phosphates, cytidine, cytidine phosphates and any salt or solvate thereof, and at least one purine derivative or any salt or solvate thereof which is selected from the group consisting of adenosine, adenosine phosphates and any salt or solvate thereof.
63. The multilayer pharmaceutical or nutraceutical solid dosage form according to clause 1, wherein the first layer comprises at least one purine derivative or any salt or solvate thereof.
64. The multilayer pharmaceutical or nutraceutical solid dosage form according to clause 63, wherein the first layer comprises at least one purine derivative or any salt or solvate thereof which is selected from the group consisting of adenosine, adenosine esters, adenosine phosphates, guanosine, guanosine esters, guanosine phosphates, inosine, inosine esters, inosine phosphates, xanthosine, xanthosine esters, xanthosine phosphates and any salt or solvate thereof.
65. The multilayer pharmaceutical or nutraceutical solid dosage form according to clause 63 or 64, wherein the first layer comprises at least one purine derivative or any salt or solvate thereof which is selected from the group consisting of adenosine, adenosine phosphates, guanosine, guanosine phosphates, inosine, inosine phosphates, xanthosine, xanthosine phosphates and any salt or solvate thereof.
66. The multilayer pharmaceutical or nutraceutical solid dosage form according to any of clauses 63-65, wherein the first layer comprises at least one purine derivative or any salt or solvate thereof which is selected from the group consisting of adenosine, adenosine phosphates, guanosine, guanosine phosphates and any salt or solvate thereof.
67. The multilayer pharmaceutical or nutraceutical solid dosage form according to any of clauses 63-66, wherein the first layer comprises at least one purine derivative or any salt or solvate thereof which is selected from the group consisting of adenosine, adenosine phosphates and any salt or solvate thereof.
68. The multilayer pharmaceutical or nutraceutical solid dosage form according to any of clauses 57-67, wherein the at least one vitamin selected from the group consisting of B-group vitamins of the second layer is vitamin $B_1$, $B_6$ and $B_{12}$.
69. The multilayer pharmaceutical or nutraceutical solid dosage form according to any of clauses 57-68, wherein the at least one vitamin selected from the group consisting of B-group vitamins of the second layer is vitamin $B_{12}$.
70. The multilayer pharmaceutical or nutraceutical solid dosage form according to any of clauses 57-69, wherein the at least one vitamin selected from the group consisting of B-group vitamins of the second layer is vitamin $B_{12}$ in the form of cyanocobalamin, hydroxycobalamin or methylcobalamin.
71. The multilayer pharmaceutical or nutraceutical solid dosage form according to any of clauses 57-70, wherein the at least one vitamin selected from the group consisting of B-group vitamins of the second layer is vitamin $B_{12}$ in the form of cyanocobalamin or hydroxycobalamin.
72. The multilayer pharmaceutical or nutraceutical solid dosage form according to any of clauses 59-71, wherein the at least one vitamin selected from the group consisting of B-group vitamins of the second layer is vitamin $B_{12}$ in the form of cyanocobalamin.
73. The multilayer pharmaceutical or nutraceutical solid dosage form according to any of clauses 69-72, wherein the second layer further comprises vitamin $B_1$.
74. The multilayer pharmaceutical or nutraceutical solid dosage form according to the preceding clause, wherein vitamin $B_1$ is in the form of thiamine hydrochloride, thiamine nitrate, thiamine pyrophosphate or thiamine monophosphate chloride dihydrate.
75. The multilayer pharmaceutical or nutraceutical solid dosage form according to clause 73 or 74, wherein vitamin $B_1$ is thiamine nitrate.
76. The multilayer pharmaceutical or nutraceutical solid dosage form according to any of clauses 69-75, wherein the second layer further comprises $B_6$ vitamin.
77. The multilayer pharmaceutical or nutraceutical solid dosage form according to the preceding clause, wherein $B_6$ vitamin is in the form of pyridoxine hydrochloride or pyridoxal phosphate.
78. The multilayer pharmaceutical or nutraceutical solid dosage form according to any of clauses 68-77, wherein the second layer comprises vitamins $B_1$, $B_6$ and $B_{12}$.
79. The multilayer pharmaceutical or nutraceutical solid dosage form according to the preceding clause, wherein the second layer comprises vitamin $B_{12}$ in the form of cyanocobalamin, vitamin $B_6$ in the form of pyridoxine hydrochloride and vitamin $B_1$ in the form of thiamine hydrochloride or thiamine nitrate.
80. The multilayer pharmaceutical or nutraceutical solid dosage form according to the preceding clause, wherein the second layer comprises vitamin $B_{12}$ in the form of cyanocobalamin, vitamin $B_6$ in the form of pyridoxine hydrochloride and vitamin $B_1$ in the form of thiamine nitrate.
81. The multilayer pharmaceutical or nutraceutical solid dosage form according to any preceding clause, wherein the solid dosage form is a multilayer tablet.
82. The multilayer pharmaceutical or nutraceutical solid dosage form according to any preceding clause, wherein the solid dosage form is a laminated multilayer tablet or a concentric multilayer tablet.
83. The multilayer pharmaceutical or nutraceutical solid dosage form according to any preceding clause, wherein the solid dosage form is a concentric layered bead.
84. The multilayer pharmaceutical or nutraceutical solid dosage form according to any preceding clause, further comprising a third layer comprising at least one suitable pharmaceutical or nutraceutical excipient.
85. The multilayer pharmaceutical or nutraceutical solid dosage form according to the preceding clause, wherein the third layer is placed in adjacent position to either the first layer of the second layer, or is placed adjacent to both.
86. The multilayer pharmaceutical or nutraceutical solid dosage form according to any preceding clause, wherein the first layer comprises at least one suitable pharmaceutical or nutraceutical excipient.
87. The multilayer pharmaceutical or nutraceutical solid dosage form according to any preceding clause, wherein the second layer comprises at least one suitable pharmaceutical or nutraceutical excipient.
88. The multilayer pharmaceutical or nutraceutical solid dosage form according to any preceding clause, which comprises a total amount of at least 200 mg of said pyrimidine derivative(s) and any salt, solvate and salt solvate thereof, wherein the total amount is calculated considering the corresponding equivalent base form(s) of each of said pyrimidine derivative(s) and salt(s) or solvate(s) thereof.
89. The multilayer pharmaceutical or nutraceutical solid dosage form according to any preceding clause, which comprises a total amount in the range of from 200 mg to 450 mg, still more preferably in the range of from 250 mg to 450 mg, still even more preferably in the range of from 250 mg to 430 mg, much more preferably in the range of from 300 mg to 420 mg, and even more preferably in the range of from 350 mg to 410 mg of said pyrimidine derivative(s), purine derivative(s) and any salt, or solvate thereof, wherein the total amount is calculated considering the corresponding equivalent base form(s) of each of said pyrimidine derivative(s) and salt(s) or solvate(s) thereof.
90. The multilayer pharmaceutical or nutraceutical solid dosage form according to any of clauses 1-87, which comprises a total amount of at least 200 mg of said pyrimidine derivative(s) and any salt or solvate thereof, wherein the total amount is calculated considering the corresponding equivalent base form(s) of each of said pyrimidine derivative(s), purine derivative(s) and salt(s) or solvate(s) thereof.
91. The multilayer pharmaceutical or nutraceutical solid dosage form according to the preceding clause, which comprises a total amount in the range of from 200 mg to 450 mg, more preferably in the range of from 250 mg to 430 mg, still more preferably in the range of from 300 mg to 420 mg, even more preferably in the range of from 350 mg to 410 mg, and still even more preferably 400 mg, of said pyrimidine derivative(s), purine derivative(s) and any salt or solvate thereof, wherein the total amount is calculated considering the corresponding equivalent base form(s) of each of said pyrimidine derivative(s), purine derivative(s) and salt(s) or solvate(s) thereof.
92. The multilayer pharmaceutical or nutraceutical solid dosage form according to any of clauses 1-87, which comprises a total amount of at least 200 mg of said pyrimidine derivative(s) and any salt or solvate thereof, wherein the total amount is calculated considering the corresponding equivalent base form(s) of each of said purine derivative(s), purine derivative(s) and salt(s) or solvate(s) thereof.
93. The multilayer pharmaceutical or nutraceutical solid dosage form according to the preceding clause, which comprises a total amount in the range of from 200 mg to 450 mg, still more preferably in the range of from 250 mg to 450 mg, still even more preferably in the range of from 250 mg to 430 mg, much more preferably in the range of from 300 mg to 420 mg, and even much more preferably in the range of from 350 mg to 410 mg of said purine derivative(s) and any salt or solvate thereof, wherein the total amount is calculated considering the corresponding equivalent base form(s) of each of said purine derivative(s) and salt(s) or solvate(s) thereof.
94. The multilayer pharmaceutical or nutraceutical solid dosage form according to any preceding clause, wherein said solid dosage form is stable after being stored at 25° C. and 60% relative humidity for a period of at least 3 months, preferably for a period of at least 6 months.
95. The multilayer pharmaceutical or nutraceutical solid dosage form according to any preceding clause, wherein said solid dosage form is stable after being stored at 40° C. and 75% relative humidity for a period of at least 3 months, more preferably at 40° C. and 75% relative humidity for a period of at least 6 months.
96. The multilayer pharmaceutical or nutraceutical solid dosage form according to any preceding clause, wherein said solid dosage form is stable after being stored at 25° C. and 60% relative humidity for a period of at least 3 months, preferably at 25° C. and 60% relative humidity for a period of at least 6 months, more preferably at 40° C. and 75% relative humidity for a period of at least 3 months, and still more preferably at 40° C. and 75% relative humidity for a period of at least 6 months.
97. The multilayer pharmaceutical or nutraceutical solid dosage form according to any preceding clause, wherein said solid dosage form is stable after being stored at 25° C. and 60% relative humidity for a period of at least 3 months, preferably at 25° C. and 60% relative humidity for a period of at least 6 months, more preferably at 25° C. and 60% relative humidity at 40° C. and 75% relative humidity for a period of at least 3 months, and still more preferably at 40° C. and 75% relative humidity for a period of at least 6 months, when packed in a PVC/PVDC blister in aluminium foil.
98. A method for producing a multilayer pharmaceutical or nutraceutical solid dosage form according to any clause 1-97 which comprises:
(i) providing a first layer composition comprising at least one pyrimidine derivative, purine derivative, or any salt or solvate thereof by sieving the at least one pyrimidine derivative, purine derivative or any salt or solvate thereof and optionally at least one suitable pharmaceutical or nutraceutical excipient, and then blending the resulting mixture until homogeneity;
(ii) providing a second layer composition comprising at least one vitamin selected from the group consisting of B-group vitamins and optionally at least one suitable pharmaceutical or nutraceutical excipient by sieving the at least one vitamin selected from the group consisting of B-group vitamins and optionally at least one suitable pharmaceutical or nutraceutical excipient, and then blending the resulting mixture until homogeneity; and
(iii) compressing one of the first or second layer composition, and then compressing the other of the first or second layer composition on or around the previous layer to form a pharmaceutical or nutraceutical solid dosage form.
99. A method for producing a multilayer pharmaceutical or nutraceutical solid dosage form according to any clause 1-97 which comprises:
(i) providing a first layer composition comprising at least one pyrimidine derivative or any salt or solvate thereof by sieving the at least one pyrimidine derivative or any salt or solvate thereof and optionally at least one suitable pharmaceutical or nutraceutical excipient, and then blending the resulting mixture until homogeneity;
(ii) providing a second layer composition comprising at least one vitamin selected from the group consisting of B-group vitamins and optionally at least one suitable pharmaceutical or nutraceutical excipient by sieving the at least one vitamin selected from the group consisting of B-group vitamins and optionally at least one suitable pharmaceutical or nutraceutical excipient, and then blending the resulting mixture until homogeneity; and
(iii) compressing one of the first or second layer composition, and then compressing the other of the first or second layer composition on or around one previous layer to form a pharmaceutical or nutraceutical solid dosage form.
100. A method for producing a multilayer pharmaceutical or nutraceutical solid dosage form according to any clause 1-97 which comprises:
(i) providing a first layer composition comprising at least one pyrimidine derivative, purine derivative, or any salt or solvate thereof by sieving the at least one pyrimidine derivative, purine derivative, or any salt or solvate thereof and optionally at least one suitable pharmaceutical or nutraceutical excipient, and then blending the resulting mixture until homogeneity;
(ii) providing a second layer composition comprising at least one vitamin selected from the group consisting of B-group vitamins by sieving the at least one vitamin selected from the group consisting of B-group vitamins and optionally at least one suitable pharmaceutical or nutraceutical excipient, and then blending the resulting mixture until homogeneity;
(iii) providing a third layer composition comprising at least one suitable pharmaceutical or nutraceutical excipient which is an inert ingredient; and
(iv) compressing one of the first or second layer composition and then compressing the third layer composition on or around the previous layer, followed by compressing the other of the first or second layer composition on or around the third layer composition.

101. A method for producing a multilayer pharmaceutical or nutraceutical solid dosage form according to any clause 1-97 which comprises:
(i) providing a first layer composition comprising at least one pyrimidine derivative, purine derivative, or any salt or solvate thereof by sieving the at least one pyrimidine derivative, purine derivative, or any salt or solvate thereof and optionally at least one suitable pharmaceutical or nutraceutical excipient, and then blending the resulting mixture until homogeneity;
(ii) providing a second layer composition comprising at least one vitamin selected from the group consisting of B-group vitamins by sieving the at least one vitamin selected from the group consisting of B-group vitamins and optionally at least one suitable pharmaceutical or nutraceutical excipient, and then blending the resulting mixture until homogeneity;
(iii) providing a third layer composition comprising at least one suitable pharmaceutical or nutraceutical excipient which is an inert ingredient; and
(iv) compressing one of the first or second layer composition and then compressing the third layer composition on or around the previous layer, followed by compressing the other of the first or second layer composition on or around the third layer composition.

102. A method for producing a multilayer pharmaceutical or nutraceutical solid dosage form according to any clause 1-97 which comprises:
(i) providing a first layer composition comprising at least one pyrimidine derivative, purine derivative, or any salt or solvate thereof by sieving the at least one pyrimidine derivative, purine derivative, or any salt or solvate thereof and optionally at least one suitable pharmaceutical or nutraceutical excipient, then blending the resulting mixture until homogeneity, and subsequently compressing the resulting mixture to form a core;
(ii) providing a second layer composition comprising at least one vitamin selected from the group consisting of B-group vitamins and optionally at least one suitable pharmaceutical or nutraceutical excipient, wherein the ingredients are dispersed or dissolved in either water or an organic solvent to form either an aqueous or organic dispersion or solution, respectively; and
(iii) applying the resulting dispersion or solution of step (ii) onto the core obtained in step (i) using coating means.

103. A method for producing a multilayer pharmaceutical or nutraceutical solid dosage form according to any clause 1-97 which comprises:
(i) providing a first layer composition comprising at least one pyrimidine derivative, purine derivative, or any salt or solvate thereof by sieving the at least one pyrimidine derivative, purine derivative, or any salt or solvate thereof and optionally at least one suitable pharmaceutical or nutraceutical excipient, then blending the resulting mixture until homogeneity, and subsequently compressing the resulting mixture to form a core;
(ii) providing a third layer composition comprising at least one suitable pharmaceutical or nutraceutical excipient; preferably, comprising at least one film-forming agent, which is more preferably selected from the group consisting of hydroxypropylmethylcellulose, polyvinyl alcohol and partially hydrolyzed polyvinyl alcohol; wherein the third layer composition is applied onto the core obtained in step (1) using coating means;
(iii) providing a second layer composition comprising at least one vitamin selected from the group consisting of B-group vitamins and optionally at least one suitable pharmaceutical or nutraceutical excipient, wherein the ingredients are dispersed or dissolved in either water or an organic solvent to form either an aqueous or organic dispersion or solution, respectively; and
(iv) applying the resulting dispersion or solution of step (iii) onto the third layer obtained in step (ii) using coating means.

104. A multilayer pharmaceutical or nutraceutical solid dosage form according to any of clauses 1-97 which is obtainable by the process according to any of clauses 98-103.

105. A multilayer pharmaceutical or nutraceutical solid dosage form according to any of clauses 1-97 which is obtained by the process according to any of clauses 98-103.

106. A multilayer pharmaceutical or nutraceutical solid dosage form according to any of clauses 1-97 for use in the manufacture of a medicament or a nutraceutical product, respectively, for the treatment and/or prevention of peripheral neuropathy.

107. The multilayer pharmaceutical or nutraceutical solid dosage form for use according to clause 106, wherein the peripheral neuropathy is selected from the group consisting of peripheral polyneuropathy, peripheral radiculopathy, causalgia and reflex sympathetic dystrophy, post-mastectomy neuralgia, post-surgical neuralgia and pain, vulvar vestibulitis, phantom limb pain, thalamic syndrome (central post-stroke pain), temporo mandibular joint syndrome, metatarsalgia (Morton's neuralgia), and neurogenic pain from nerve compression.

108. Use of a multilayer nutraceutical solid dosage form according to any of clauses 1-97 in the treatment and/or prevention of peripheral neuropathy.

109. The use according to claim 108, wherein the peripheral neuropathy is selected from the group consisting of peripheral polyneuropathy, peripheral radiculopathy, causalgia and reflex sympathetic dystrophy, post-mastectomy neuralgia, post-surgical neuralgia and pain, vulvar vestibulitis, phantom limb pain, thalamic syndrome (central post-stroke pain), temporo mandibular joint syndrome, metatarsalgia (Morton's neuralgia), and neurogenic pain from nerve compression.

110. A multilayer pharmaceutical or nutraceutical solid dosage form according to any of clauses 1-97 for use in the treatment and/or prevention of peripheral neuropathy.

111. The multilayer pharmaceutical or nutraceutical solid dosage form according to claim 110, wherein the peripheral neuropathy is selected from the group consisting of peripheral polyneuropathy, peripheral radiculopathy, causalgia and reflex sympathetic dystrophy, post-mastectomy neuralgia, post-surgical neuralgia and pain, vulvar vestibulitis, phantom limb pain, thalamic syndrome (central post-stroke pain), temporo mandibular joint syndrome, metatarsalgia (Morton's neuralgia), and neurogenic pain from nerve compression.

EXAMPLES

The present invention will now be described in more detail with reference to the following examples, which should in no way be construed to be limiting the scope of the present invention.

Example 1—Exemplary Multilayer Pharmaceutical or Nutraceutical Solid Dosage Forms of the Invention The following illustrative general solid dosage forms comprising at least one pyrimidine derivative, purine derivative or any salt of solvate thereof, and B vitamins can be readily prepared using the processes of the invention (as exemplified in Examples 2 and 7):

|  | Combinations | Combinations | Combinations | Combinations |
|---|---|---|---|---|
| Layer 1 | UMP-2Na<br>CMP-2Na | UMP-2Na<br>CMP acid form | UMP-acid form<br>CMP-2Na | UMP-acid form<br>CMP acid form |
| Layer 2 | cyanocobalamin<br>Optionally with:<br>Thiamine nitrate<br>Pyridoxine HCl | cyanocobalamin<br>Optionally with:<br>Thiamine nitrate<br>Pyridoxine HCl | cyanocobalamin<br>Optionally with:<br>Thiamine nitrate<br>Pyridoxine HCl | cyanocobalamin<br>Optionally:<br>Thiamine nitrate<br>Pyridoxine HCl |
| Layer 1 | UMP-2Na<br>CMP-2Na | UMP-2Na<br>CMP acid form | UMP-acid form<br>TMP-2Na | UMP-acid form<br>TMP-2Na |
| Layer 2 | hydroxycobalamin<br>Optionally with:<br>Thiamine nitrate<br>Pyridoxine HCl | hydroxycobalamin<br>Optionally with:<br>Thiamine HCl<br>Pyridoxine HCl | hydroxycobalamin<br>Optionally with:<br>Thiamine nitrate<br>Pyridoxine HCl | hydroxycobalamin<br>Optionally:<br>Thiamine nitrate<br>Pyridoxine HCl |
| Layer 1 | UMP-2Na<br>AMP-2Na | UMP-2Na<br>IMP-2Na | AMP-2Na<br>CMP-2Na | AMP-2Na<br>CMP acid form |
| Layer 2 | hydroxycobalamin<br>Optionally with:<br>Thiamine nitrate<br>Pyridoxine HCl | hydroxycobalamin<br>Optionally with:<br>Thiamine HCl<br>Pyridoxine HCl | hydroxycobalamin<br>Optionally with:<br>Thiamine nitrate<br>Pyridoxine HCl | hydroxycobalamin<br>Optionally with:<br>Thiamine HCl<br>Pyridoxine HCl |

Example 2—Exemplary Process for Preparing a Bilayer Pharmaceutical or Nutraceutical Solid Dosage Form of the Invention According to the Second Aspect of the Invention Layer 1 manufacturing: raw materials (i.e. UMP·2Na, CMP·2Na or CMP in acid form, microcrystalline cellulose and colloidal silicon dioxide) are weighed according to batch formula, then sieved through a medium-sized mesh sieve and later blended in a blender up to homogeneity. Afterwards, magnesium stearate is sieved using a small-sized mesh sieve and blended with the previous mixture until homogeneity is observed.

Layer 2 manufacturing: raw materials (i.e. vitamin $B_1$, vitamin $B_6$, vitamin $B_{12}$, mannitol, iron oxide, microcrystalline cellulose and colloidal silicon dioxide) are weighed according to batch formula, then sieved through a medium-sized mesh sieve and later blended in a blender up to homogeneity. The resulting blend is then sieved through a medium-sized mesh and then blended again. Aferwards, magnesium stearate is weighed according to batch formula, sieved using a small-sized mesh sieve and then blended with the previous mixture until homogeneity is observed.

Tableting: layer 1 is first compressed in a multilayer tableting machine, and then layer 2 is loaded on layer 1 and subsequently compressed to form a bilayer tablet according to the following exemplary weights:

Layer 1: 650 mg

Layer 2: 200 mg

Total weight: 850 mg

Example 3—Multilayer Pharmaceutical or Nutraceutical Solid Dosage Forms According to the Invention (UMP·2Na, CMP·2Na/CMP in Acid Form, Thiamine Nitrate, Pyridoxine HCl, Cyanobalamin)

Exemplary bilayer tablets (DG186106B1, DG186108B1 and 18631N1101 batches) were prepared with the following compositions and according to the process described in Example 2:

|  | DG186106B1 Weight | DG186108B1 Weight | 18631N1101 Weight |
|---|---|---|---|
| Layer 1 (total wt. 650 mg) | | | |
| UMP-2Na | 386.487 mg[1] | 386.487 mg[1] | 393.185 mg[4] |
| CMP-2Na | 127.994 mg[2] | — | 130.208 mg[5] |
| CMP in acid form | ---- | 103.918 mg[3] | — |
| Microcrystalline cellulose | 122.519 mg | 146.595 mg | 113.607 mg |
| Colloidal silicon dioxide Aerosil® | 6.500 mg | 6.500 mg | 6.500 mg |
| Magnesium stearate | 6.500 mg | 6.500 mg | 6.500 mg |
| Layer 2 (total wt. 200 mg) | | | |
| Thiamine nitrate | 1.493 mg | 1.493 mg | 1.493 mg |
| Pyridoxine HCl | 2.042 mg | 2.042 mg | — |
| Cyanocobalamin | 2.640 µg | 2.640 µg | 2.640 µg |
| Mannitol | 2.637 mg | 2.673 mg | 2.637 mg |
| Red iron oxide E-172 | 0.250 mg | 0.250 mg | 0.250 mg |
| Microcrystalline cellulose | 189.575 mg | 189.539 mg | 191.617 mg |
| Colloidal silicon dioxide Aerosil® | 2.000 mg | 2.000 mg | 2.000 mg |
| Magnesium stearate | 2.000 mg | 2.000 mg | 2.000 mg |

[1]386.487 mg actually correspond to 264.200 mg of UMP in base form after considering water content.
[2]127.994 mg actually correspond to 88.000 mg of CMP in base form after considering water content.
[3]103.918 mg actually correspond to 100.000 mg of CMP in base form after considering water content.
[4]379.747 mg actually correspond to 264.200 mg of UMP in base form after considering water content.
[5]129.441 mg actually correspond to 88.000 mg of CMP in base form after considering water content.

Example 4—Stability Testing of Multilayer Pharmaceutical or Nutraceutical Solid Dosage Forms According to the Invention (UMP·2Na, CMP·2Na, Thiamine Nitrate, Pyridoxine HCl, Cyanobalamin)

Stability testing of two of the bilayer solid dosage forms of Example 3 (DG186106B1 bilayer tablet batch—UMP·2Na, CMP·2Na, thiamine nitrate, pyridoxine HCl and cyanocobalamin; DG186108B1 bilayer tablet batch—UMP·2Na, CMP in acid form, thiamine nitrate, pyridoxine HCl and cyanocobalamin), prepared according to Example 2, in PVC/PVDC blister in aluminium foil, was carried out. Results can be summarized as follows (assay results at t=1.5 and 3.0 months are expressed relative to the actual value at time t=0, which has been here considered as 100%; % assay calculated by HPLC):

| | DG186106B1 | | |
|---|---|---|---|
| | | Assay (%) t = 3 months | |
| INGREDIENT | Assay (%) t = 0 | 25° C./60% RH | 40° C./75% RH |
| Thiamine nitrate | 100.0 | 102.1 | 101.7 |
| Pyridoxine HCl | 100.0 | 98.3 | 92.3 |
| Cyanocobalamin | 100.0 | 100.3 | 98.5 |

| | DG186108B1 | | | |
|---|---|---|---|---|
| INGREDIENT | Assay (%) t = 0 | Assay (%) t = 1.5 months 40° C./75% RH | Assay (%) t = 3 months 25° C./60% RH | Assay (%) t = 3 months 40° C./75% RH |
| Thiamine nitrate | 100.0 | 99.5 | 100.3 | 95.9 |
| Pyridoxine HCl | 100.0 | 105.1 | 102.6 | 97.5 |
| Cyanocobalamin | 100.0 | 98.3 | 94.7 | 87.5 |

Example 5—Exemplary Process for Preparing a Bilayer Pharmaceutical or Nutraceutical Solid Dosage Forms of the Invention According to the Third Aspect of the Invention Layer 1 manufacturing: raw materials (i.e. UMP·2Na, CMP·2Na or CMP in acid form, microcrystalline cellulose, hydroxypropylcellulose and colloidal silicon dioxide) are weighed according to batch formula, then sieved through a medium-sized mesh sieve and later blended in a blender up to homogeneity. Afterwards, magnesium stearate is sieved using a small-sized mesh sieve and blended with the previous mixture until homogeneity is observed.

Layer 2 manufacturing: raw materials (i.e. vitamin $B_1$, vitamin $B_6$, vitamin $B_{12}$, mannitol, iron oxide, microcrystalline cellulose and hydroxypropylcellulose) are weighed according to batch formula, then sieved through a medium-sized mesh sieve and granulated in the presence of water. Colloidal silicon dioxide, together with microcrystalline cellulose in an amount corresponding to 2.7% wt. in respect of the total amount of microcrystalline cellulose, are sieved using a small-sized mesh sieve and then blended with the previous mixture until homogeneity is observed. Afterwards, magnesium stearate is also weighed, sieved using a small-sized mesh sieve and then added onto the resulting blend and blended until homogeneity is obtained.

Tableting: layer 1 is first compressed in a multilayer tableting machine, and then layer 2 is loaded on layer 1 and compressed to form a bilayer tablet according to the following exemplary weights:

Layer 1: 650 mg    Layer 2: 200 mg    Total weight: 850 mg

Example 6—Multilayer Pharmaceutical or Nutraceutical Solid Dosage Form According to the Invention (UMP·2Na, CMP·2Na/CMP in Acid Form, Thiamine Nitrate, Cyanobalamin)

Exemplary bilayer tablets (DG186070A1 and DG186072A1 batches) were prepared with the following compositions and according to the process described in Example 5:

| | DG186070A1 batch Weight | DG186072A1 batch Weight |
|---|---|---|
| Layer 1 (total wt. 650 mg) | | |
| UMP·2Na | 386.487 mg[1] | 386.487 mg[1] |
| CMP·2Na | 127.994 mg[2] | — |
| CMP in acid form | — | 103.386 mg[3] |
| Microcrystalline cellulose | 103.019 mg | 127.627 mg |
| Hydroxypropylcellulose | 19.500 mg | 19.500 mg |
| Colloidal silicon dioxide Aerosil® | 6.500 mg | 6.500 mg |
| Magnesium stearate | 6.500 mg | 6.500 mg |
| Layer 2 (total wt. 200 mg) | | |
| Thiamine nitrate | 1.493 mg | 1.493 mg |
| Pyridoxine HCl | 2.042 mg | 2.042 mg |
| Cyanocobalamin | 2.640 µg | 2.640 µg |
| Hydroxypropylcellulose | 4.000 mg | 4.000 mg |
| Red iron oxide E-172 | 0.250 mg | 0.250 mg |
| Microcrystalline cellulose | 190.212 mg | 190.212 mg |
| Colloidal silicon dioxide Aerosil® | 1.000 mg | 1.000 mg |
| Magnesium stearate | 1.000 mg | 1.000 mg |

[1]386.487 mg actually correspond to 264.200 mg of UMP in base form after considering water content.
[2]127.994 mg actually correspond to 88.000 mg of CMP in base form after considering water content.
[3]103.386 mg actually correspond to 100.000 mg of CMP in base form after considering water content.

Example 7—Multilayer Pharmaceutical or Nutraceutical Solid Dosage Form According to the Invention (UMP·2Na, CMP·2Na, Thiamine Nitrate, Pyridoxine HCl, Cyanobalamin)

Exemplary trilayer tablets (batches DG186087A1 and DG186089A1) were prepared with the compositions described below and according to the process of the third aspect of the invention, that is:
Layer 1 manufacturing: raw materials (i.e. UMP·2Na, CMP·2Na or CMP in acid form, microcrystalline cellulose, hydroxypropylcellulose and colloidal silicon dioxide Aerosil®) are weighed according to batch formula, then sieved through a medium-sized mesh sieve and later blended in a blender up to homogeneity. Afterwards, magnesium stearate is weighed, sieved using a small-sized mesh sieve and blended with the previous mixture until homogeneity is observed.
Layer 2 manufacturing: raw materials (i.e. vitamin B1, vitamin B6, vitamin B12, hydroxypropylcellulose, red iron oxide E-172 and microcrystalline cellulose) are weighed according to batch formula, then sieved through a medium-sized mesh sieve and granulated in the presence of water. Colloidal silicon dioxide, together with microcrystalline cellulose in an amount corresponding to 2.7% wt. in respect of the total amount of microcrystalline cellulose, are sieved using a small-sized mesh sieve and then blended with the previous mixture until homogeneity is observed. Afterwards, magnesium stearate is also weighed, sieved using a small-sized mesh sieve and then added onto the resulting blend and blended until homogeneity is obtained.

Layer 3 (inert layer) manufacturing: Microcrystalline cellulose in an amount of 20% wt. in respect of the total amount of microcrystalline cellulose, together with red iron oxide E-172, are weighed according to batch formula and then sieved through a medium-sized mesh sieve and blended until homogeneity. Then, the remaining 80% wt. of microcrystalline cellulose is also sieved in the same way and then added to the previous blend, and afterwards, magnesium stearate is also sieved accordingly and then added to the previous blend. The resulting mixture is blended until homogeneity.

Tableting: layer 1 is first compressed in a multilayer tableting machine, and then layer 3 is loaded on layer 1 and compressed to form a bilayer tablet. Afterwards, layer 2 is loaded on layer 3 and compressed to form the corresponding trilayer tablet according to the following exemplary weights:

Layer 1: 650 mg
Layer 2: 200 mg
Layer 3: 200 mg
Total weight: 1050 mg

The composition of trilayer tablets (i.e. DG186087A1 and DG186089A1 batches) is as follows:

|  | DG186087A1 batch Weight | DG186089A1 batch Weight |
|---|---|---|
| Layer 1 (total wt. 650 mg) | | |
| UMP-2Na | 386.487 mg[1] | 386.487 mg[1] |
| CMP-2Na | 127.994 mg[2] | — |
| CMP in acid form | — | 103.386 mg[3] |
| Microcrystalline cellulose | 103.019 mg | 127.627 mg |
| Hyd roxypropylcellu lose | 19.500 mg | 19.500 mg |
| Colloidal silicon dioxide Aerosil ® | 6.500 mg | 6.500 mg |
| Magnesium stearate | 6.500 mg | 6.500 mg |
| Layer 2 (total wt. 200 mg) | | |
| Thiamine nitrate | 1.493 mg | 1.493 mg |
| Pyridoxine HCl | 2.042 mg | 2.042 mg |
| Cyanocobalamin | 2.640 µg | 2.640 µg |
| Hyd roxypropylcellulose | 4.000 mg | 4.000 mg |
| Red iron oxide E-172 | 0.250 mg | 0.250 mg |
| Microcrystalline cellulose | 190.212 mg | 190.212 mg |
| Colloidal silicon dioxide Aerosil ® | 1.000 mg | 1.000 mg |
| Magnesium stearate | 1.000 mg | 1.000 mg |
| Layer 3 (total wt. 200 mg) | | |
| Microcrystalline cellulose | 197.875 mg | 197.875 mg |
| Red iron oxide E-172 | 0.125 mg | 0.125 mg |
| Magnesium stearate | 2.000 mg | 2.000 mg |

[1]386.487 mg actually correspond to 264.200 mg of UMP in base form after considering water content.
[2]127.994 mg actually correspond to 88.000 mg of CMP in base form after considering water content.
[3]103.386 mg actually correspond to 100.000 mg of CMP in base form after considering water content.

Comparative Example 1—Monolayer Solid Dosage Form Comprising UMP·2Na, CMP·2Na, Thiamine Nitrate, Pyridoxine HCl and Cyanobalamin A monolayer tablet (DG186075A1 batch) was prepared for comparative purposes in the following manner:

UMP·2Na, CMP·2Na, microcrystalline cellulose, hydroxypropylcellulose and colloidal silicon dioxide are weighed according to batch formula, then sieved through a medium-sized mesh sieve and later blended in a blender up to homogeneity. Afterwards, magnesium stearate is sieved using a small-sized mesh sieve and blended with the previous mixture until homogeneity is observed.

In parallel, vitamin $B_1$, vitamin $B_6$, vitamin $B_{12}$, mannitol, iron oxide, microcrystalline cellulose and hydroxypropylcellulose are weighed according to batch formula, then sieved through a medium-sized mesh sieve and granulated in the presence of water. Colloidal silicon dioxide, together with microcrystalline cellulose in an amount corresponding to 2.7% wt. in respect of the total amount of microcrystalline cellulose, are sieved using a small-sized mesh sieve and then blended with the previous mixture until homogeneity is observed. Afterwards, magnesium stearate is also weighed, sieved using a small-sized mesh sieve and then added onto the resulting blend and blended until homogeneity is obtained. This second blend is then added to the first blend containing UMP·2Na and CMP·2Na, and the resulting blend is then mixed until homogeneity and then compressed in a tableting machine as monolayer tablet.

The composition of this solid dosage form is identical to one of the previous solid dosage forms of Example 6, namely, the one corresponding to DG186070A1 bilayer tablet batch, the difference being that it is in the form of monolayer tablets instead of bilayer ones.

|  | DG186075A1 batch Weight |
|---|---|
| UMP-2Na | 386.487 mg[1] |
| CMP-2Na | 127.994 mg[2] |
| Microcrystalline cellulose | 103.019 mg |
| Hydroxypropylcellulose | 19.500 mg |
| Colloidal silicon dioxide Aerosil ® | 6.500 mg |
| Magnesium stearate | 6.500 mg |
| Thiamine nitrate | 1.493 mg |
| Pyridoxine HCl | 2.042 mg |
| Cyanocobalamin | 2.640 µg |
| Hydroxypropylcellulose | 4.000 mg |
| Red iron oxide E-172 | 0.250 mg |
| Microcrystalline cellulose | 190.212 mg |
| Colloidal silicon dioxide Aerosil ® | 1.000 mg |
| Magnesium stearate | 1.000 mg |

[1]386.487 mg actually correspond to 264.200 mg of UMP in base form after considering water content.
[2]127.994 mg actually correspond to 88.000 mg of CMP in base form after considering water content.

Example 8—Stability Testing of Multilayer Pharmaceutical or Nutraceutical Solid Dosage Forms of Examples 6, 7 and Comparative Example 1

Stability testing of the following solid dosage forms was carried out:

Bilayer tablets of Example 6 (DG186070A1 and DG186072A1 batches);
Trilayer tablets of Example 7 (DG186087A1 and DG186089A1 batches); and Monolayer tablets of Comparative Example 1 (DG186075A1 batch).

Results obtained are summarized in the following table (assay results at t=1.5 months are expressed relative to the actual value at time t=0, which has been here considered as 100%; % assay calculated by HPLC):

| INGREDIENT | Assay (%) t = 0 | DG186070A1 | DG186072A1 | DG186087A1 | DG186089A1 | DG186075A1 |
|---|---|---|---|---|---|---|
| | | \multicolumn{5}{c}{Assay (%) t = 1.5 months; 40° C./75% RH; Alu-Alu blister} | | | | |
| Thiamine nitrate | 100.0 | 97.7 | 105.3 | 104.1 | 97.4 | 94.2 |
| Pyridoxine HCl | 100.0 | 95.1 | 108.7 | 106.0 | 101.5 | 99.9 |
| Cyanocobalamin | 100.0 | 86.6 | 85.1 | 93.3 | 85.3 | 62.3 |
| UMP·2Na | 100.0 | 99.9 | 99.3 | 97.8 | 98.1 | 100.3 |
| CMP·2Na | 100.0 | 98.3 | — | 98.9 | — | 101.7 |
| CMP in acid form | 100.0 | — | 104.4 | — | 101.6 | — |

The invention claimed is:

1. A multilayer pharmaceutical or nutraceutical solid dosage form for oral administration comprising:
   a first layer comprising at least one pyrimidine derivative or any salt or solvate thereof; and
   a second layer comprising one or more of vitamin $B_1$ or vitamin $B_{12}$;
   wherein the at least one pyrimidine derivative, or any salt or solvate thereof is selected from the group of uridine, uridine phosphates, cytidine, cytidine phosphates, thymidine, thymidine phosphates, and any salt or solvate thereof.

2. The multilayer pharmaceutical or nutraceutical solid dosage form according to claim 1, wherein the first layer comprises at least two pyrimidine derivatives.

3. The multilayer pharmaceutical or nutraceutical solid dosage form according to claim 2, wherein the two pyrimidine derivatives are selected from uridine phosphates, cytidine phosphates or any salt or solvate thereof.

4. The multilayer pharmaceutical or nutraceutical solid dosage form according to claim 3, wherein the two pyrimidine derivatives are uridine monophosphate and cytidine monophosphate, wherein each one of them is either in salt form or in acid form.

5. The multilayer pharmaceutical or nutraceutical solid dosage form according to claim 3, wherein the two pyrimidine derivatives are uridine monophosphate in salt form and cytidine monophosphate in either salt or acid form.

6. The multilayer pharmaceutical or nutraceutical solid dosage form according to claim 1, wherein the second layer comprises both vitamins $B_1$ and $B_{12}$.

7. The multilayer pharmaceutical or nutraceutical solid dosage form according to claim 1, which comprises a total amount of at least 200 mg of said pyrimidine derivative(s), and any salt or solvate thereof, wherein the total amount is calculated considering the corresponding equivalent base form(s) of each of said pyrimidine derivative(s), and salt(s) or solvate(s) thereof.

8. The multilayer pharmaceutical or nutraceutical solid dosage form according to claim 1, wherein said solid dosage form is stable after being stored at 40° C. and 75% relative humidity for a period of at least 6 months.

9. A method for producing the multilayer pharmaceutical or nutraceutical solid dosage form according to claim 1 which comprises:
   (i) providing a first layer composition comprising at least one pyrimidine derivative, or any salt or solvate thereof by sieving the at least one pyrimidine derivative, or any salt or solvate thereof and optionally at least one suitable pharmaceutical or nutraceutical excipient, and then blending the resulting mixture until homogeneity;
   (ii) providing a second layer composition comprising one or more of vitamin $B_1$ or vitamin $B_{12}$ by sieving the one or more of vitamin $B_1$ or vitamin $B_{12}$ and optionally at least one suitable pharmaceutical or nutraceutical excipient, and then blending the resulting mixture until homogeneity; and
   (iii) compressing one of the first or second layer composition, and then compressing the other of the first or second layer composition on or around one previous layer to form a pharmaceutical or nutraceutical solid dosage form.

10. A method for producing the multilayer pharmaceutical or nutraceutical solid dosage form according to claim 1 which comprises:
   (i) providing a first layer composition comprising at least one pyrimidine derivative or any salt or solvate thereof by sieving the at least one pyrimidine derivative, or any salt or solvate thereof and optionally at least one suitable pharmaceutical or nutraceutical excipient, and then blending the resulting mixture until homogeneity;
   (ii) providing a second layer composition comprising one or more of vitamin $B_1$ or vitamin $B_{12}$ by sieving the one or more of vitamin $B_1$ or vitamin $B_{12}$ and then subjecting it to granulation in the presence of water; and
   (iii) compressing one of the first or second layer composition, and then compressing the other of the first or second layer composition on or around one previous layer to form a pharmaceutical or nutraceutical solid dosage form.

11. A multilayer pharmaceutical or nutraceutical solid dosage form obtainable by the process as defined in claim 9.

12. A multilayer pharmaceutical or nutraceutical solid dosage form according to claim 1 for use in the treatment and/or prevention of peripheral neuropathy.

13. The multilayer pharmaceutical or nutraceutical solid dosage form according to claim 4, wherein the two pyrimidine derivatives are uridine monophosphate in salt form and cytidine monophosphate in either salt or acid form.

14. A method for producing the multilayer pharmaceutical or nutraceutical solid dosage form according to claim 2 which comprises:
   (i) providing a first layer composition comprising at least one pyrimidine derivative or any salt or solvate thereof by sieving the at least one pyrimidine derivative, or any salt or solvate thereof and optionally at least one suitable pharmaceutical or nutraceutical excipient, and then blending the resulting mixture until homogeneity;
   (ii) providing a second layer composition comprising one or more of vitamin $B_1$ or vitamin $B_{12}$ by sieving the one or more of vitamin $B_1$ or vitamin $B_{12}$ and optionally at least one suitable pharmaceutical or nutraceutical excipient, and then blending the resulting mixture until homogeneity; and (iii) compressing one of the first or second layer composition, and then compressing the other of the first or second layer composition on or around one previous layer to form a pharmaceutical or nutraceutical solid dosage form.

15. A method for producing the multilayer pharmaceutical or nutraceutical solid dosage form according to claim 3 which comprises:

(i) providing a first layer composition comprising at least one pyrimidine derivative or any salt or solvate thereof by sieving the at least one pyrimidine derivative, or any salt or solvate thereof and optionally at least one suitable pharmaceutical or nutraceutical excipient, and then blending the resulting mixture until homogeneity;

(ii) providing a second layer composition comprising one or more of vitamin $B_1$ or vitamin $B_{12}$ by sieving the one or more of vitamin $B_1$ or vitamin $B_{12}$ and optionally at least one suitable pharmaceutical or nutraceutical excipient, and then blending the resulting mixture until homogeneity; and (iii) compressing one of the first or second layer composition, and then compressing the other of the first or second layer composition on or around one previous layer to form a pharmaceutical or nutraceutical solid dosage form.

16. A method for producing the multilayer pharmaceutical or nutraceutical solid dosage form according to claim 4 which comprises:

(i) providing a first layer composition comprising at least one pyrimidine derivative or any salt or solvate thereof by sieving the at least one pyrimidine derivative, or any salt or solvate thereof and optionally at least one suitable pharmaceutical or nutraceutical excipient, and then blending the resulting mixture until homogeneity;

(ii) providing a second layer composition comprising one or more of vitamin $B_1$ or vitamin $B_{12}$ by sieving the one or more of vitamin $B_1$ or vitamin $B_{12}$ and optionally at least one suitable pharmaceutical or nutraceutical excipient, and then blending the resulting mixture until homogeneity; and (iii) compressing one of the first or second layer composition, and then compressing the other of the first or second layer composition on or around one previous layer to form a pharmaceutical or nutraceutical solid dosage form.

17. A method for producing the multilayer pharmaceutical or nutraceutical solid dosage form according to claim 5 which comprises:

(i) providing a first layer composition comprising at least one pyrimidine derivative or any salt or solvate thereof by sieving the at least one pyrimidine derivative, or any salt or solvate thereof and optionally at least one suitable pharmaceutical or nutraceutical excipient, and then blending the resulting mixture until homogeneity;

(ii) providing a second layer composition comprising one or more of vitamin $B_1$ or vitamin $B_{12}$ by sieving the one or more of vitamin $B_1$ or vitamin $B_{12}$ and optionally at least one suitable pharmaceutical or nutraceutical excipient, and then blending the resulting mixture until homogeneity; and (iii) compressing one of the first or second layer composition, and then compressing the other of the first or second layer composition on or around one previous layer to form a pharmaceutical or nutraceutical solid dosage form.

18. A method for producing the multilayer pharmaceutical or nutraceutical solid dosage form according to claim 6 which comprises:

(i) providing a first layer composition comprising at least one pyrimidine derivative or any salt or solvate thereof by sieving the at least one pyrimidine derivative, or any salt or solvate thereof and optionally at least one suitable pharmaceutical or nutraceutical excipient, and then blending the resulting mixture until homogeneity;

(ii) providing a second layer composition comprising vitamins $B_1$ and $B_{12}$ by sieving the vitamins $B_1$ and $B_{12}$ and optionally at least one suitable pharmaceutical or nutraceutical excipient, and then blending the resulting mixture until homogeneity; and (iii) compressing one of the first or second layer composition, and then compressing the other of the first or second layer composition on or around one previous layer to form a pharmaceutical or nutraceutical solid dosage form.

19. The multilayer pharmaceutical or nutraceutical solid dosage form according to claim 1, wherein the at least one pyrimidine derivative, or any salt or solvate thereof is at least one of cytidine, cytidine phosphates, thymidine, thymidine phosphates, or any salt or solvate thereof.

* * * * *